US012411442B2

(12) United States Patent
Haematsu et al.

(10) Patent No.: US 12,411,442 B2
(45) Date of Patent: Sep. 9, 2025

(54) IMAGE FORMING APPARATUS THAT CHANGES A FIXING CONDITION BASED ON TEMPERATURES OF A HEATING MEMBER DETECTED AT DIFFERENT TIMES

(71) Applicant: CANON KABUSHIKI KAISHA, Tokyo (JP)

(72) Inventors: Kohei Haematsu, Shizuoka (JP); Takahiro Uchiyama, Shizuoka (JP); Keisuke Mochizuki, Shizuoka (JP); Hirohiko Aiba, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/364,608

(22) Filed: Aug. 3, 2023

(65) Prior Publication Data

US 2024/0053696 A1 Feb. 15, 2024

(30) Foreign Application Priority Data

Aug. 9, 2022 (JP) ................................ 2022-127345
Jun. 22, 2023 (JP) ................................ 2023-102208

(51) Int. Cl.
*G03G 15/20* (2006.01)
*G03G 15/00* (2006.01)

(52) U.S. Cl.
CPC ....... *G03G 15/205* (2013.01); *G03G 15/2064* (2013.01); *G03G 15/5045* (2013.01); *G03G 15/2035* (2013.01)

(58) Field of Classification Search
USPC ........................................................... 399/69
See application file for complete search history.

(56) References Cited

U.S. PATENT DOCUMENTS 9,709,936 B1 * 7/2017 Ball ........................ G06F 1/305
2006/0039713 A1 * 2/2006 Kishi .................. G03G 15/205 399/70
2019/0265627 A1 * 8/2019 Kitabayashi ....... G03G 15/2042

FOREIGN PATENT DOCUMENTS

EP 668547 A2 * 8/1995 ......... G03G 15/2039
JP 3539538 B2 * 7/2004 ........... G03G 15/161
JP 3596821 B2 * 12/2004 ......... G03G 15/2003
JP 2011-197287 A 10/2011
JP 2017-090754 A 5/2017
JP 2020-166430 A 10/2020
JP 2021-149056 A 9/2021

* cited by examiner

*Primary Examiner* — Quana Grainger
(74) *Attorney, Agent, or Firm* — Venable LLP

(57) ABSTRACT

An image forming apparatus includes an image forming portion, a fixing unit including a fixing member, a heating member, and a temperature detection portion, and a control portion configured to execute warm-up processing. If a temperature of the heating member at a first timing in a period of time in which the heating member is being heated in the warm-up processing is a first temperature, a temperature of the heating member at a second timing that is in the period of time and that is later than the first timing is a second temperature, and a temperature of the heating member at a timing different from the first timing and the second timing is a third temperature, the control portion is configured to change a fixing condition used in the job, based on the first temperature, the second temperature, and the third temperature.

21 Claims, 22 Drawing Sheets

FIG.6

| FILM THICKNESS D | FIXING TEMPERATURE IN SHEET FEEDING Tc2 [°C] | | | | | |
|---|---|---|---|---|---|---|
| | 176 | 180 | 184 | 188 | 192 | 196 |
| 14 μm | ▲ | ▲ | ▲ | ▲ | ○ | ○ |
| 10 μm | ▲ | ▲ | ▲ | ○ | ○ | ○ |
| 6 μm | ▲ | ▲ | ○ | ○ | ○ | △ |
| 2 μm | ▲ | ○ | ○ | ○ | △ | △ |

EXAMPLE 1 COMPARATIVE EXAMPLE 1

○ : NO IMAGE DEFECT OCCURRED

△ : HOT OFFSET OCCURRED (EXCESSIVE HEAT)

▲ : FAILURE IN FIXING OCCURRED (INSUFFICIENT HEAT)

FIG.12A

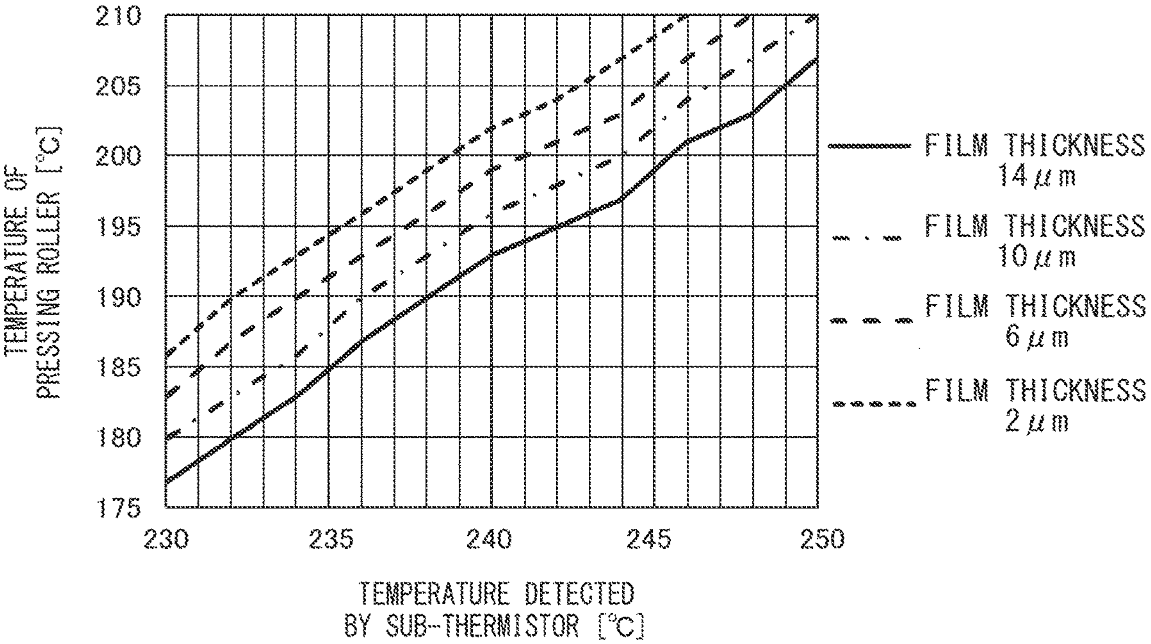

FIG.12B

| FILM THICKNESS D | TEMPERATURE DETECTED BY SUB-THERMISTOR [°C] | | | | | | | | | | | | | | | |
|---|---|---|---|---|---|---|---|---|---|---|---|---|---|---|---|---|
| | 230°C | | 232°C | | 234°C | | 236°C | | 238°C | | 240°C | | 242°C | | 244°C | |
| 14 μm | 177°C | ○ | 180°C | ○ | 183°C | ○ | 187°C | ○ | 190°C | ▲ | 193°C | △ | 195°C | △ | 197°C | △ |
| 10 μm | 180°C | ○ | 183°C | ○ | 186°C | ○ | 190°C | ▲ | 193°C | △ | 196°C | △ | 198°C | △ | 200°C | × |
| 6 μm | 183°C | ○ | 187°C | ○ | 190°C | ▲ | 193°C | △ | 196°C | △ | 199°C | △ | 201°C | × | 203°C | × |
| 2 μm | 186°C | ○ | 190°C | ▲ | 193°C | △ | 196°C | △ | 199°C | △ | 202°C | × | 204°C | × | 207°C | × |

○: TEMPERATURE AT WHICH FIXING UNIT CAN BE USED

▲: THRESHOLD TEMPERATURE FOR TEMPERATURE RISE IN NON-SHEET PASSING AREA

△: CONTROL MARGIN AREA

×: TEMPERATURE AT WHICH FIXING UNIT CANNOT BE USED

FIG.17

| POWER CONSUMPTION Pw | FEEDING ALLOWANCE TEMPERATURE[°C] | |
|---|---|---|
| | 160 | 170 |
| 1100 W | ○ | ○ |
| 900 W | ▲ | ○ |

○ : NO IMAGE DEFECT OCCURRED

▲ : FAILURE OF FIXING OCCURRED (INSUFFICIENT HEAT)

FIG.19

| POWER CONSUMPTION Pw | THROUGHPUT (SHEETS/MINUTE) | |
|---|---|---|
| | 30 | 43 |
| 1100 W | ○ | ○ |
| 900 W | ○ | ▲ |

○ : NO IMAGE DEFECT OCCURRED
▲ : FAILURE OF FIXING OCCURRED (INSUFFICIENT HEAT)

FIG.22

| POWER CONSUMPTION Pw | POWER-SUPPLY-DUTY-CYCLE CORRECTION AMOUNT B | | |
|---|---|---|---|
| | 0.86 | 1.00 | 1.22 |
| 1300 W | ○ | △, ▲ | △, ▲ |
| 1100 W | ▲ | ○ | △, ▲ |
| 900 W | ▲ | ▲ | ○ |

△ : HOT OFFSET OCCURRED (EXCESSIVE HEAT)
○ : NO IMAGE DEFECT OCCURRED
▲ : FAILURE OF FIXING OCCURRED (INSUFFICIENT HEAT)

IMAGE FORMING APPARATUS THAT CHANGES A FIXING CONDITION BASED ON TEMPERATURES OF A HEATING MEMBER DETECTED AT DIFFERENT TIMES

BACKGROUND OF THE INVENTION

Field of the Invention

The present invention relates to an image forming apparatus that forms images on recording materials.

Description of the Related Art

A known fixing unit used for image forming apparatuses has a heat-fixing system that fixes an image formed on a recording material, to the recording material by heating the image. Examples of the heat fixing system include a film heating system that uses a thin fixing film as a fixing member, and a roller heating system that uses a cylindrical roller as the fixing member.

In a fixing unit that has the heat-fixing system, if the wear of the surface layer of the fixing member proceeds, an image defect called a hot offset, and thermal damage of the fixing member or peripheral members may occur. The hot offset is caused by the change in heat capacity or thermal conductivity of the fixing member, and the thermal damage is caused by a temperature rise in a non-sheet passing area. Japanese Patent Application Publication No. 2017-90754 describes, in the third embodiment, a configuration for determining whether the surface layer of the fixing film has a sufficient film thickness. Specifically, the determination is performed, depending on the detection result on the surface temperature of the fixing film, in a state where the temperature control is being performed on a heater so that the heater has a predetermined temperature.

In Japanese Patent Application Publication No. 2017-90754, however, since a temperature detection member that detects the surface temperature of the fixing film is disposed, for performing the control based on the thickness of the fixing film, in addition to a thermistor that detects the temperature of the heater, the apparatus has a complicated configuration.

SUMMARY OF THE INVENTION

The present invention provides an image forming apparatus that can perform a control in accordance with a state of a fixing unit, with a simple configuration.

According to one aspect of the invention, an image forming apparatus includes an image forming portion configured to form an image on a recording material, a fixing unit including a fixing member configured to rotate, a heating member configured to be energized to heat the fixing member, and a temperature detection portion configured to output a detection signal corresponding to a temperature of the heating member, the fixing unit being configured to fix the image to the recording material by using the fixing member, and a control portion configured to execute warm-up processing in which the heating member is heated to a predetermined target temperature, the warm-up processing being executed in a period of time before a first recording material is conveyed to the fixing unit in a case where a job for forming the image on the recording material is inputted to the image forming apparatus, wherein if a temperature of the heating member at a first timing in the period of time in which the heating member is being heated in the warm-up processing is a first temperature, a temperature of the heating member at a second timing that is in the period of time and that is later than the first timing is a second temperature, and a temperature of the heating member at a timing different from the first timing and the second timing is a third temperature, the control portion is configured to change a fixing condition used in the job, based on the first temperature, the second temperature, and the third temperature that are detected by the temperature detection portion.

Further features of the present invention will become apparent from the following description of exemplary embodiments with reference to the attached drawings.

BRIEF DESCRIPTION OF THE DRAWINGS

FIG. 6 is a table illustrating whether an image defect was caused by the film thickness of the surface layer of the fixing film and the set value of the fixing temperature.

FIG. 12A is a graph illustrating a relationship between the temperature detected by a sub-thermistor of the third embodiment and the surface temperature of a pressing roller.

FIG. 12B is a table illustrating a relationship between the temperature detected by the sub-thermistor of the third embodiment, the surface temperature of a pressing roller, and the temperature at which the fixing unit can be used.

FIG. 17 is a table illustrating whether an image defect was caused by the set value of the feeding allowance temperature of the fourth embodiment.

FIG. 19 is a table illustrating whether an image defect was caused by the set value of throughput of the fifth embodiment.

FIG. 22 is a table illustrating whether an image defect was caused by the set value of the power-supply-duty-cycle correction amount of the sixth embodiment.

DESCRIPTION OF THE EMBODIMENTS

Hereinafter, some embodiments of the present disclosure will be described with reference to the accompanying drawings.

First Embodiment

(1) Image Forming Apparatus

Figure 1:
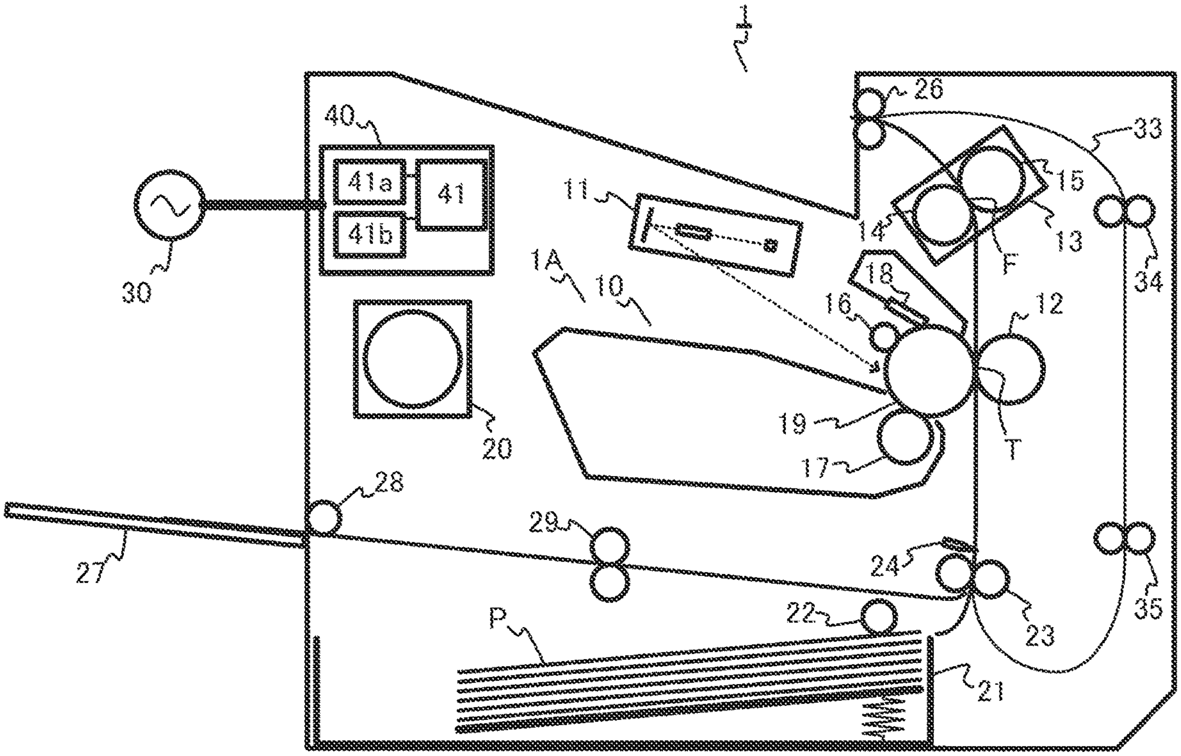
FIG. 1 is a schematic diagram of an image forming apparatus of a first embodiment.

First, a configuration of an image forming apparatus 1 of a first embodiment will be described with reference to FIG. 1. FIG. 1 is a schematic diagram of the image forming apparatus 1 of the first embodiment. The image forming apparatus 1 is a laser beam printer that forms an image on a recording material P by using an electrophotographic system. The recording material P may be a paper sheet, such as a plain paper sheet or a thick paper sheet, a plastic film, a cloth sheet, a sheet material, such as a coated paper sheet, on which certain surface treatment has been performed, a specially-shaped sheet material, such as an envelope or an index paper sheet, or any one of a variety of sheets having different sizes and materials.

The image forming apparatus 1 includes an image forming portion 1A and a control portion 40. The image forming portion 1A includes a process cartridge 10, a laser scanner 11, and a transfer roller 12; and the control portion 40 controls the operation of the image forming apparatus 1. The image forming portion 1A functions as an image forming portion (i.e., a toner-image forming portion) that forms an image (i.e., a toner image) on the recording material P by using developer (i.e., toner).

The process cartridge 10 includes a photosensitive drum 19 that serves as an image bearing member (i.e., an electrophotographic photoreceptor), a charging roller 16 that serves as a charging portion, a developing roller 17 that serves as a development portion, and a cleaning blade 18 that serves as a cleaning portion. The process cartridge 10 of the present embodiment is constituted by a developing unit that includes the photosensitive drum 19, the charging roller 16, and the developing roller 17, and by a cleaning unit that includes the cleaning blade 18. The process cartridge 10 is detachably attached to the apparatus body of the image forming apparatus 1.

The laser scanner 11 is an example of an exposure portion that exposes the image bearing member to light. The transfer roller 12 is an example of a transfer portion that transfers an image from the image bearing member onto the recording material P.

The photosensitive drum 19 is a photosensitive member formed like a drum (a cylinder); and when an image is formed, the photosensitive drum 19 is rotated counterclockwise in FIG. 1, at a predetermined circumferential speed (i.e., a process speed). The charging roller 16 uniformly charges (primary-charges) a circumferential surface of the photosensitive drum 19 so that the circumferential surface has a predetermined polarity and potential. The primary-charged circumferential surface of the photosensitive drum 19 is irradiated with a laser beam from the laser scanner 11, so that an electrostatic latent image is formed on the circumferential surface of the photosensitive drum 19. Note that the control portion 40 receives image information, used for forming an image on the recording material P, from an external apparatus; and sends a video signal, produced based on the image information, to the laser scanner 11. The laser scanner 11 outputs a laser beam that has been on-off modulated in accordance with the video signal, and thereby performs the exposure process for forming the electrostatic latent image on the circumferential surface of the photosensitive drum 19. The developing roller 17 develops the electrostatic latent image, formed on the circumferential surface of the photosensitive drum 19, into a toner image by bearing developer that contains toner and supplying the developer onto the photosensitive drum 19.

The image forming apparatus 1 also includes a feeding tray 21, a feeding roller 22, a conveyance roller pair 23, a top sensor 24, a fixing unit 13, a discharging roller pair 26, and a motor 20.

The motor 20 is a driving source that provides driving force to the image bearing member and members that convey the recording material P. In the present embodiment, a plurality of members, including the feeding roller 22, the conveyance roller pair 23, the photosensitive drum 19, the fixing unit 13, and the discharging roller pair 26, are provided with the driving force, by the motor 20.

The feeding tray 21 can be attached to and detached from the apparatus body of the image forming apparatus 1. The feeding tray 21 contains the recording material P stacked on the feeding tray 21. When the feeding roller 22 is driven depending on a feeding start signal from the control portion 40, the recording material P contained in the feeding tray 21 is separated from other sheets, one by one, and conveyed to the conveyance roller pair 23. The recording material P is then introduced into a transfer nip T by the conveyance roller pair 23. The transfer nip T serves as a transfer portion formed between the photosensitive drum 19 and the transfer roller 12.

The top sensor 24 is disposed on a conveyance path between the conveyance roller pair 23 and the transfer nip T; and detects a timing at which the leading edge of the recording material P, sent from the conveyance roller pair 23, passes the top sensor 24. The control portion 40 adjusts the timing at which the formation of an electrostatic latent image is started by the laser scanner 11, in accordance with the timing which is detected by the top sensor 24, and at which the leading edge of the recording material P passes the top sensor 24. That is, the control portion 40 controls the timing, at which the formation of an electrostatic latent image is started by the laser scanner 11, so that the leading edge portion of the toner image formed on the photosensitive drum 19 reaches the transfer nip T when the leading edge portion of the recording material P reaches the transfer nip T.

The recording material P introduced into the transfer nip T is nipped and conveyed by the photosensitive drum 19 and the transfer roller 12 in the transfer nip T. While the recording material P is nipped and conveyed by the photosensitive drum 19 and the transfer roller 12, the transfer roller 12 is applied, by a power supply (not illustrated), with a transfer voltage whose polarity is opposite to the normal polarity of charged toner. As a result, a toner image borne by the circumferential surface of the photosensitive drum 19 is electrostatically transferred onto a surface of the recording material P. The recording material P onto which the toner image has been transferred is conveyed from the transfer nip T to the fixing unit 13. Note that the circumferential surface of the photosensitive drum 19 that has passed through the transfer nip T has transfer residual toner, paper dust, and the like. They are removed by the cleaning blade 18, and primary-charged again so that the circumferential surface is used for the next image formation.

The fixing unit 13 includes a fixing film 14 that serves as a fixing member, and a pressing roller 15 that serves as a pressing member. The fixing unit 13 will be described in detail below. The fixing unit 13 fixes an image (i.e., a toner image) to the recording material P by causing the fixing film 14 to heat the image while causing the fixing film 14 and the pressing roller 15 to nip and convey the recording material P in a fixing nip E The fixing film 14 is controlled so as to have a predetermined temperature (i.e., a fixing temperature). The recording material P having passed through the fixing unit 13 is discharged, by the discharging roller pair 26, to a discharging tray disposed in an upper portion of the image forming apparatus 1, and stacked on the discharging tray. By performing the above-described series of operations, the image formation for a single recording material P is completed.

Note that in a case where the double-side printing is to be performed, after the recording material P passes through the transfer nip T and the fixing nip F and an image is formed on a first surface of the recording material P, the recording material P is conveyed to the discharging roller pair 26, and then pulled back to the interior of the image forming apparatus 1 by the discharging roller pair 26 rotating backward at a predetermined timing. The recording material P pulled back is conveyed toward the image forming portion 1A again, in a state where the first surface and a second surface opposite to the first surface are switched with each other, by duplex-conveyance roller pairs 34 and 35 disposed on a duplex conveyance path 33. The recording material P is conveyed again from the conveyance roller pair 23 through the transfer nip T and the fixing nip F, so that an image is formed on the second surface. The recording material P is then discharged to the discharging tray by the discharging roller pair 26.

By repeating the above-described operations, images can be formed on a plurality of recording materials P one after another. Note that the image forming apparatus 1 of the present embodiment can form a monochrome image on A4-size plain paper sheets (having a size of 210×297 mm) at a conveyance speed of 230 mm/sec. In this case, the monochrome image is formed on about 43 sheets per minute.

Note that the image forming apparatus is not limited to this. For example, the image forming apparatus may be able to perform color printing or multicolored printing. In addition, the image forming portion may have an intermediate transfer system, which primary-transfers an image (i.e., a toner image), formed on the image bearing member, onto an intermediate transfer member such as an intermediate transfer belt, and secondary-transfers the image from the intermediate transfer member onto a recording material.

In addition, the image forming apparatus 1 of the present embodiment can execute print modes: a plain paper mode, a thin paper mode, and a thick paper mode. In these modes, conditions or control for the printing operations (i.e., the image forming operations) are optimized in accordance with the types of the recording material. The plain paper mode is a mode that is optimized for the image formation performed on plain paper sheets having a grammage equal to or larger than 75 g/m$^2$ and smaller than 90 g/m$^2$. The thin paper mode is a mode that is optimized for the image formation performed on thin paper sheets having a grammage equal to or larger than 60 g/m$^2$ and smaller than 75 g/m$^2$. The thick paper mode is a mode that is optimized for the image formation performed on thick paper sheets having a grammage equal to or larger than 90 g/m$^2$ and smaller than 200 g/m$^2$. For each mode, the transfer voltage applied to the transfer roller 12, the fixing temperature, the conveyance interval for forming an image on a plurality of sheets, and the like are changed.

The control portion 40 includes a CPU 41, a ROM 41*a*, and a RAM 41*b*. The CPU 41 executes various programs stored in the ROM 41*a* while using the RAM 41*b* as a work area, and thereby controls various operations related to image formation. The ROM 41*a* and the RAM 41*b* are an example of a storage portion that stores information used for controlling the image forming apparatus 1. In addition, the ROM 41*a* is an example of a non-transitory storage medium that stores a control program of the image forming apparatus 1.

(2) Fixing Unit

Figure 2:
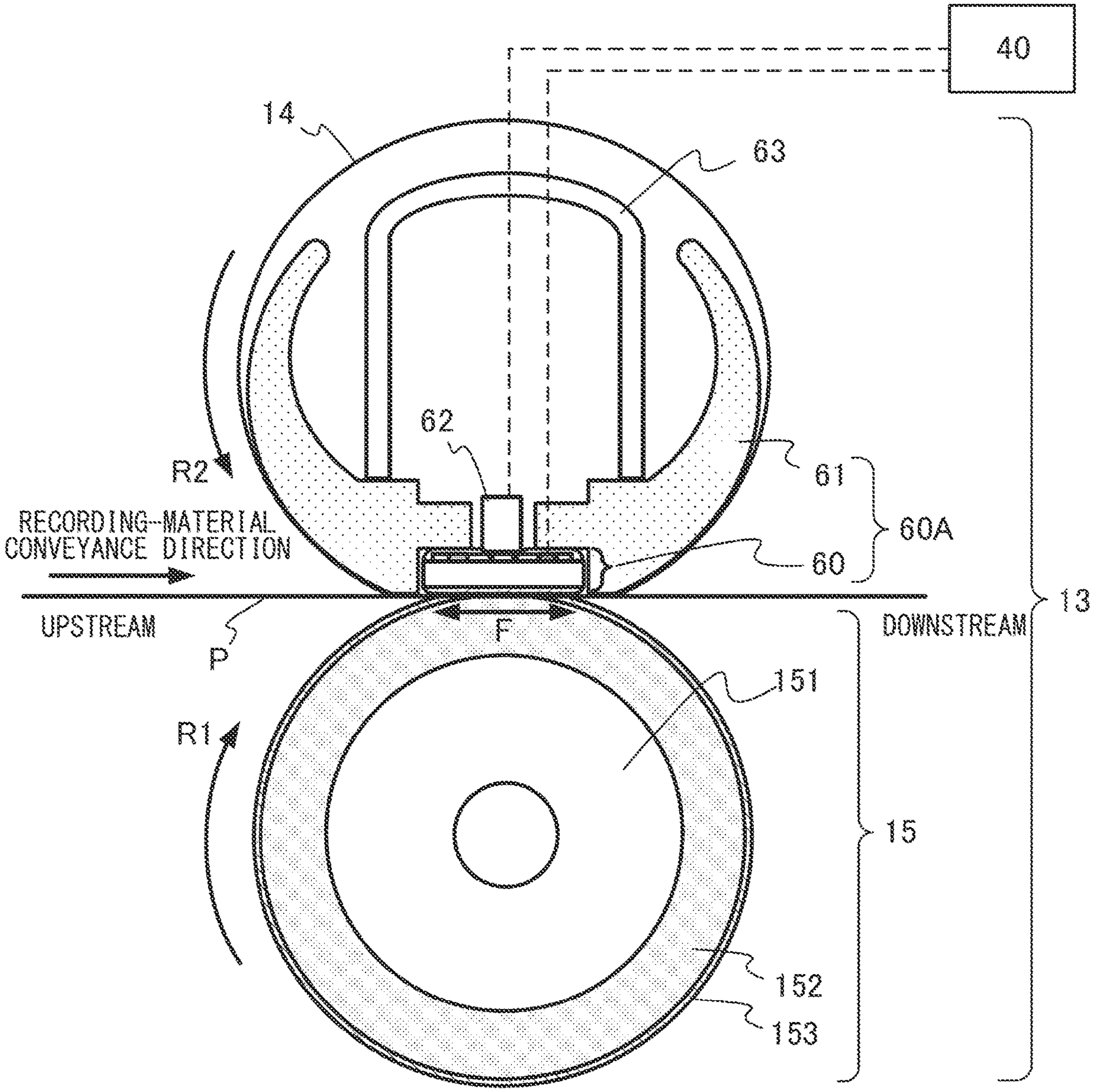
FIG. 2 is a schematic diagram of a fixing unit of the first embodiment.

Next, a configuration of the fixing unit 13 will be described with reference to FIG. 2. FIG. 2 is a schematic diagram illustrating a cross section of the fixing unit 13 of the present embodiment. The fixing unit 13 includes the fixing film 14, the pressing roller 15, a nip forming member 60A, and a pressing stay 63. The nip forming member 60A includes a heater 60 and a heater holder 61.

The fixing film 14 is an example of a fixing member. The film 14 is a tubular (endless) film-like member having flexibility. Preferably, the fixing film 14 is a film having a film thickness equal to or larger than 20 μm and equal to or smaller than 450 for reducing the thermal capacity and shortening the wait time (i.e., the first printout time: FPOT). The fixing film 14 may be a single-layer film having heat resistance property and made of PTFE, PFA, FEP, or the like. In another case, the fixing film 14 may be a multi-layered film in which a film base layer is coated with a surface layer. The film base layer may be made of polyimide, polyamide-imide, PEEK, PES, PPS, or the like; and the surface layer may be made of PTFE, PFA, FEP, or the like.

In the fixing film 14 of the present embodiment, the outer circumferential surface of a polyimide film is coated with PFA. The thickness of the polyimide film is about 60 μm, and the thickness (film thickness) of the surface layer is about 14 μm. The outer diameter of the fixing film 14 is 24 mm. The base layer of the fixing film 14 may not be made of the above-described resin material. For example, the base layer of the fixing film 14 may be made of a metal material, such as stainless steel (SUS). In addition, an elastic layer made of heat-resistant rubber, such as silicone rubber, may be formed between the base layer and the coating layer for increasing the image quality.

The pressing roller 15 is an example of a pressing member that rotates in contact with the fixing member. The pressing roller 15 is disposed so as to sandwich the fixing film 14 with the heater 60. The pressing roller 15 includes a core metal 151, an elastic layer 152, and an outermost surface layer 153. In the present embodiment, the core metal 151 is a core metal made of aluminum, the elastic layer 152 is made of silicone rubber, and the surface layer 153 is a tube made of PFA and having a thickness of about 50 μm. The outer diameter of the pressing roller 15 is 25 mm, and the thickness of the elastic layer 152 is about 3 mm.

The heater 60 is an example of a heating member (i.e., a heating element) that heats the fixing member. The heater 60 is a plate-like heat generating member that quickly heats the fixing film 14 in a state where the heater 60 is in contact with the inner circumferential surface of the fixing film 14. Specifically, the heater 60 is plate-shaped, and has a low thermal capacity. In the heater 60, a heat-generating resistance layer is formed on an insulating ceramic board, in screen printing or the like. The insulating ceramic board is made of alumina or aluminum nitride, and the heat-generating resistance layer is made of a material, such as Ag/Pd (silver-palladium alloy), $RuO_2$, or $Ta_2N$; and is configured to be energized to generate heat. In addition, a glass layer that serves as an insulation protection layer is formed on the heat-generating resistance layer. The temperature of the heater 60 is detected by a thermistor 62 that serves as a temperature detection portion that is in contact with the back surface of the board.

The heater holder 61 is disposed in the internal space of the fixing film 14, and holds the heater 60. That is, the heater 60 and the heater holder 61 function as the nip forming member 60A, which includes the heating element for heating the film, and which is disposed inside the film.

The pressing stay 63 is a member made of a material such as metal, and having stiffness. The pressing stay 63 receives pressing force from a pressing portion, such as a spring (not illustrated), and applies the pressing force to the pressing roller 15 via the heater holder 61. The pressing force causes the fixing nip F to be formed between the nip forming member 60A and the pressing roller 15, which are in pressure contact with each other via the fixing film 14. The fixing nip F serves as a nip portion that has a predetermined width.

Note that in the fixing unit 13 of the present embodiment, the heater 60 is directly in contact with the inner circumferential surface of the fixing film 14. However, a plate-like or sheet-like member having high thermal conductivity (e.g., a sheet-like member made of a material such as ferroalloy or aluminum) may be disposed between the heater 60 and the fixing film 14. That is, in the nip forming member 60A, the heater 60 may heat the fixing film 14 via a sliding member that slides on the inner circumferential surface of the fixing film 14.

In the fixing unit 13, when a print signal is sent from an external apparatus, such as an image scanner or a host computer, to the image forming apparatus 1, the pressing roller 15 is rotated by the motor 20, illustrated in FIG. 1 and controlled by the control portion 40, in a direction indicated by an arrow R1 (i.e., in the clockwise direction). Thus, the rotational force is transmitted from the pressing roller 15 to the fixing film 14 by the frictional force between the pressing roller 15 and the outer circumferential surface of the fixing film 14 in the fixing nip F. As a result, the fixing film 14 is rotated by the rotation of the pressing roller 15 while the inner circumferential surface of the fixing film 14 slides on the heater 60 in the fixing nip E In this manner, the fixing film 14 rotates around the nip forming member 60A in a direction indicated by an arrow R2 (i.e., in the counterclockwise direction) at a speed that is nearly equal to the moving speed of the circumferential surface of the pressing roller 15.

In addition, in the fixing unit 13, the electric power is supplied from the control portion 40, which is connected to an alternating-current power supply (socket) 30, to a power-supplying electrode of the heater 60, so that the heat-generating resistance layer of the heater 60 generates heat. The control portion 40 causes a triac (not illustrated), which is disposed in the control portion 40, to control the energization of the heater 60, depending on the detection signal outputted from the thermistor 62 and corresponding to the temperature of the heater 60; and thereby performs the temperature control of the heater 60. That is, if the temperature information obtained from the detection signal from the thermistor 62 is lower than a controlled target temperature (such as a below-described warm-up temperature Tc1 or fixing temperature Tc2), the control portion 40 increases the amount of electric power supplied to the heater 60. In contrast, if the temperature information obtained from the detection signal from the thermistor 62 is higher than the controlled target temperature, the control portion 40 decreases the amount of electric power supplied to the heater 60. The control portion 40 controls the amount of electric power by controlling below-described power-supply duty cycle (i.e., energization rate). In this manner, based on the detection signal from the thermistor 62, the control portion 40 controls the electric power supplied to the heater 60, which serves as a heating member, for making the temperature of the heater 60 closer to the controlled target temperature.

In a state where the fixing film 14 is rotated by the rotation of the pressing roller 15 and the heater 60 is heated up to a predetermined temperature, the recording material P onto which a toner image has been transferred is conveyed from the transfer portion to the fixing nip F. Then the toner image, which is formed on the recording material P but still not fixed to the recording material P, is heated by the fixing film 14 heated by the heat transmitted from the heater 60, while the recording material P is nipped between the fixing film 14 and the pressing roller 15 and conveyed in the fixing nip F. With this operation, the image is fixed to the recording material P The recording material P having passed through the fixing nip F is separated from the fixing film 14, and is further conveyed.

(3) Flow for Setting Controlled Target Temperature

Figure 3:
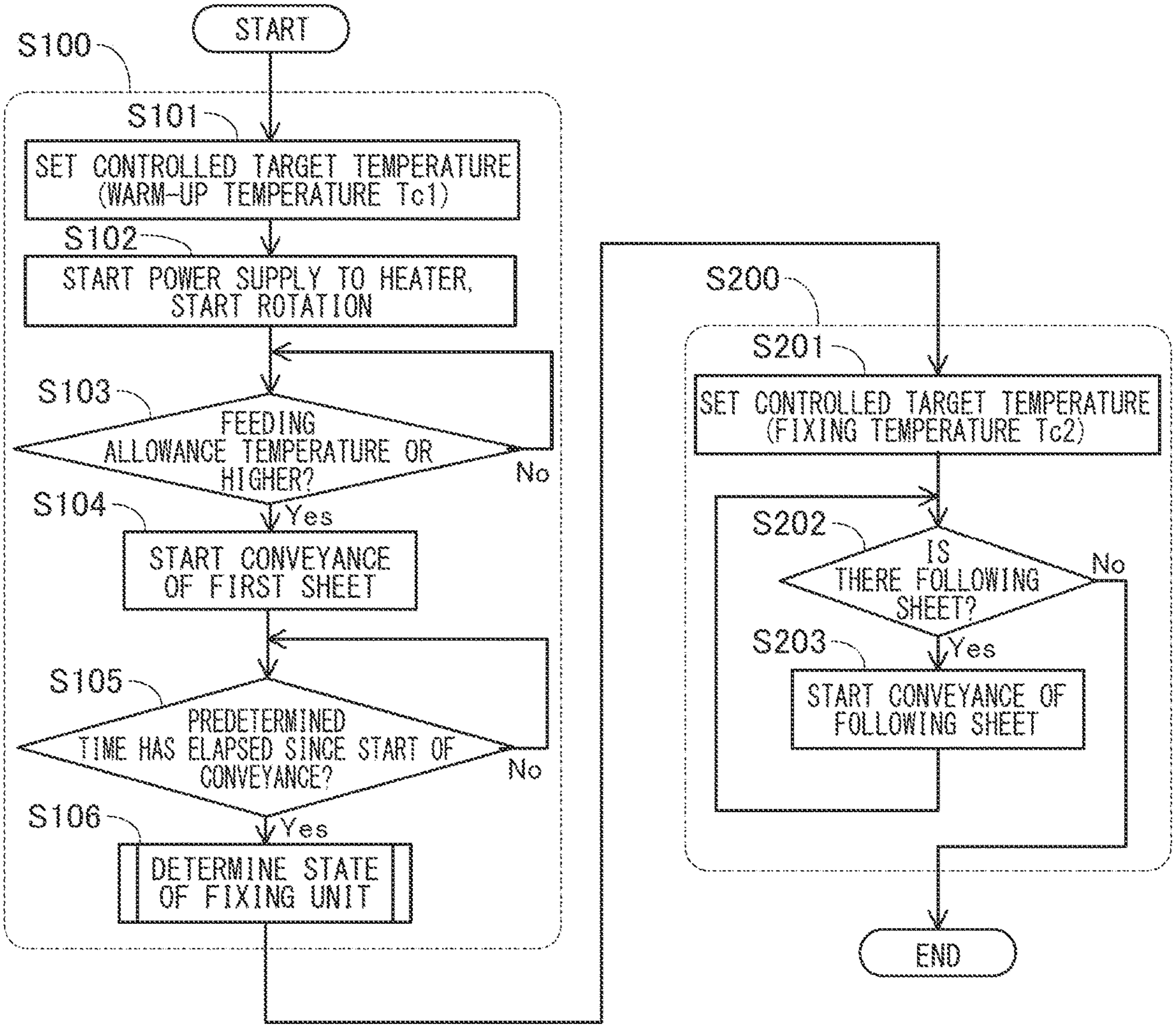
FIG. 3 is a flowchart illustrating control of the first embodiment.

Next, an operation for setting the controlled target temperature of the fixing unit 13 of the first embodiment will be described with reference to a flowchart of FIG. 3. Each process of the flowchart of FIG. 3 is executed by the CPU 41 of the control portion 40 executing a program. The same holds true for flowcharts following FIG. 4.

If a print signal is sent to the image forming apparatus 1, the control portion 40 starts a print job (i.e., an image forming job. Hereinafter, the print job may be simply referred to as a job). The print job is a series of tasks that includes a series of printing operations (image forming operations, sheet feeding operations), a preparatory operation for the printing operations, and an adjustment operation performed after the printing operations. In the printing operations, images are formed on the recording materials P while the recording materials P are conveyed one by one. The control portion 40 starts a fixing-unit warm-up sequence S100, as part of the preparatory operation performed for the printing operation. The fixing-unit warm-up sequence S100 is a series of operations (i.e., a warm-up processing) in which the fixing unit 13 is heated up to a temperature which is suitable for the fixing operation.

In the fixing-unit warm-up sequence S100, the control portion 40 sets a controlled target temperature used in the fixing-unit warm-up sequence (hereinafter, the controlled target temperature is referred to as the warm-up temperature Tc1) (S101). In S101, the control portion 40 reads reference value information on the warm-up temperature Tc1, which is set in advance for each print mode and stored in the ROM 41*a*. The control portion 40 corrects the reference value information in accordance with the temperature (i.e., an environmental temperature) of a space in which the image forming apparatus 1 is installed, and thereby determines the warm-up temperature Tc1 used in the fixing-unit warm-up sequence. If the environmental temperature has a lower value, the recording material P also has a lower value. Thus, more heat is required for fixing an unfixed toner image to the recording material P For this reason, the control portion 40 corrects the warm-up temperature Tc1 so that the warm-up temperature Tc1 has a higher value for a lower environmental temperature. In the present embodiment, a temperature sensor (not illustrated) is disposed in the image forming apparatus 1, and the control portion 40 estimates the environmental temperature, based on the value from the temperature sensor.

After the warm-up temperature Tc1 is set (S101), the rotation of the pressing roller 15 is started, and at the same time, the power supply to the heater 60 is started and the fixing unit 13 starts to warm (S102). After that, if the temperature detected by the thermistor 62 has reached a feeding allowance temperature that is set in advance and stored in the ROM 41*a* (S103), the conveyance of the recording material P from the feeding tray 21 is started (S104). After a predetermined period of time has elapsed since the start of the conveyance (S104) of the recording material P (S105), the control portion 40 determines the state of the fixing unit as described below (S106), and ends the fixing-unit warm-up sequence S100. Note that the predetermined period of time in S105 is a predetermined period of time from when the conveyance of the recording material P is started (S104) until when the leading edge of the recording material P will reach the fixing nip F in a case where the recording material P is conveyed normally.

After the fixing-unit warm-up sequence S100, a sheet passage sequence S200 is started. The sheet passage sequence S200 is a sequence in which the temperature of the fixing unit 13 is kept at a temperature suitable for the fixing operation.

In the sheet passage sequence S200, the control portion 40 sets a controlled target temperature used in the sheet passage sequence (S201) (the controlled target temperature is a target temperature of the heater 60 for fixing an image to the recording material P Hereinafter, the controlled target temperature is referred to as the fixing temperature Tc2). In S201, the control portion 40 reads reference value information on the fixing temperature Tc2, which is set in advance for each print mode and stored in the ROM 41*a*. The control portion 40 corrects the reference value information in accordance with the environmental temperature and the state of the fixing unit determined in S106, and thereby determines the fixing temperature Tc2 used in the sheet passage sequence. As in S101, the control portion 40 corrects the fixing temperature Tc2 such that the fixing temperature Tc2 increases as the environmental temperature decreases. The correction of the fixing temperature Tc2 in accordance with the state of the fixing unit will be described in detail below.

After that, the control portion 40 causes the recording material P to be nipped and conveyed in the fixing nip F, and an unfixed toner image formed on the recording material P to fix to the recording material P, while adjusting the electic power supplied to the heater 60 so that the fixing temperature Tc2, which is set in S201, is kept. If the second and the following recording materials P are to be conveyed (S202), then the control portion 40 conveys the recording materials P from the feeding tray 21 at predetermined time intervals (S203). If the fixing process has been performed on all the recording materials P, then the control portion 40 ends the sheet passage sequence S200.

Figure 4:
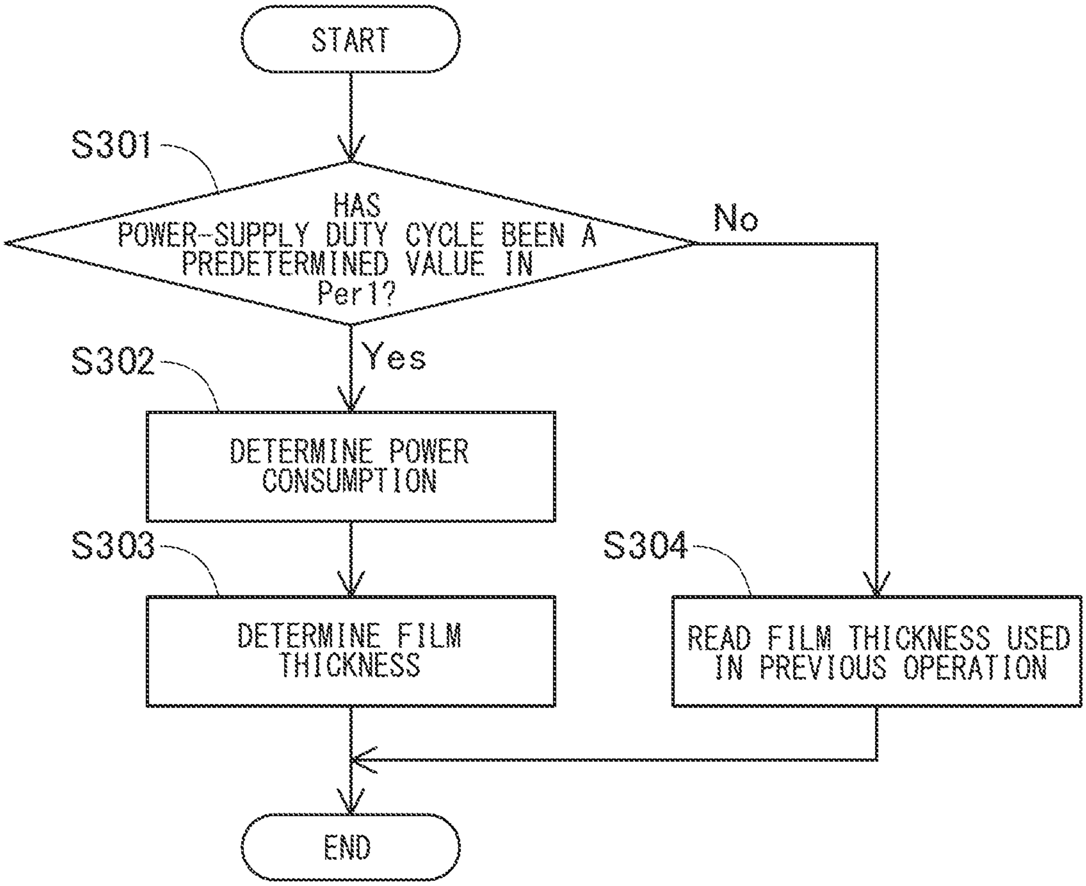
FIG. 4 is a flowchart illustrating control of the first embodiment.

(4) Determination of State of Fixing Unit and Correction of Fixing Temperature Next, the determination (S106) of the state of the fixing unit will be described with reference to a flowchart of FIG. 4.

The determination (S106) of the state of the fixing unit is performed, based on a warm-up temperature curve, in a predetermined period of time (hereinafter referred to a determination time period Per1) from when the power supply to the heater 60 is started, until when a predetermined period of time has elapsed since the start of the power supply to the heater 60. In the present embodiment, the determination time period Per1 is a period of time from when the power supply to the heater 60 is started, until when 2.5 seconds has elapsed since the start of the power supply to the heater 60.

In the determination (S106) of the state of the fixing unit, the control portion 40 determines whether the power-supply duty cycle in the determination time period Per1 has been a predetermined value (i.e., a predetermined energization rate) (S301). In the present embodiment, the control portion 40 determines whether the power-supply duty cycle in the determination time period Per1 has been 100%. If the power-supply duty cycle in the determination time period Per1 has been 100%, then control portion 40 performs power-consumption determination (S302) and film-thickness determination (S303). Then the control portion 40 determines that as the thickness (i.e., the film thickness) of the surface layer of the fixing film 14, determined in S303, is smaller, the fixing unit 13 has been used more frequently and the fixing unit 13 is reaching its service life.

Figure 5A:
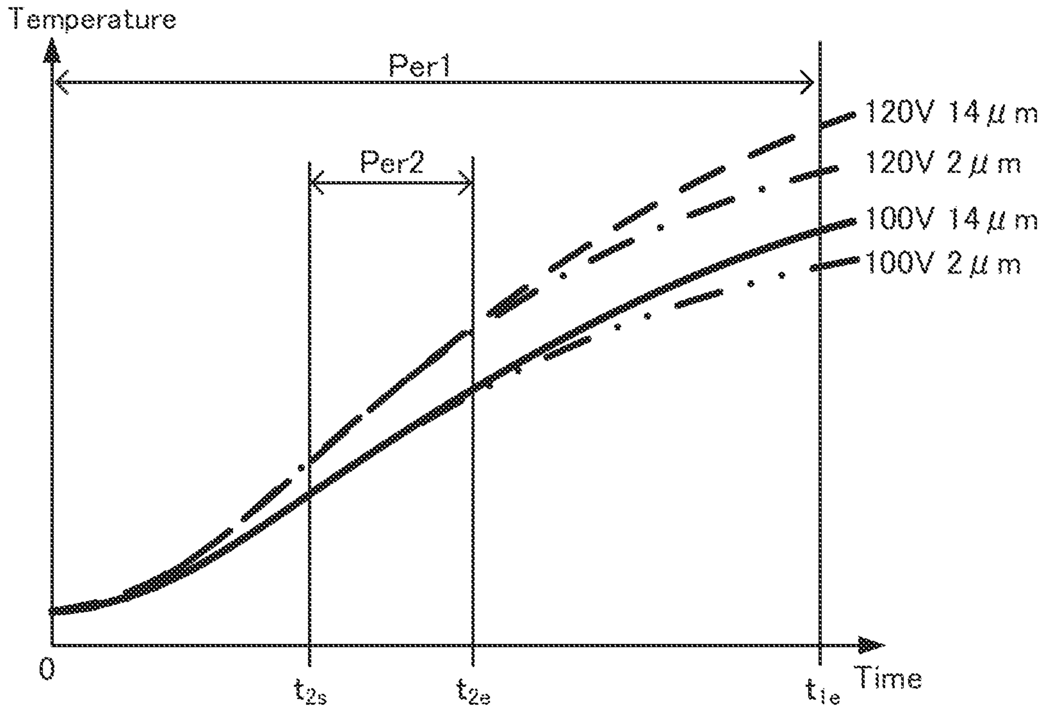
FIG. 5A is a graph illustrating an example of a warm-up temperature curve of the first embodiment.
Figure 5B:
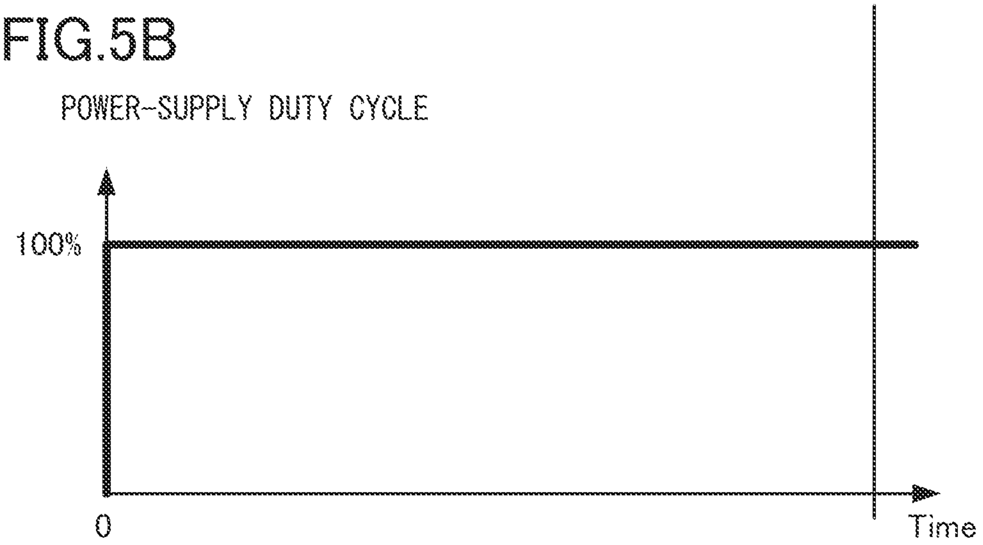
FIG. 5B is a graph illustrating an example of a power-supply duty cycle of the first embodiment.

Next, a method of the power-consumption determination (S302) will be described in detail with reference to FIGS. 5A and 5B. FIG. 5A illustrates the temperature that is detected by the thermistor 62 in the fixing-unit warm-up sequence S100, and the temperature changes with time (hereinafter, the change in the temperature with time is referred to as a warm-up temperature curve). FIG. 5A illustrates an example of the warm-up temperature curve obtained in a case where the operation of the fixing unit 13 was started at a normal temperature. FIG. 5B illustrates the power-supply duty cycle (i.e., the energization rate) that corresponds to the warm-up temperature curve illustrated in FIG. 5A. The power-supply duty cycle (i.e., the energization rate) is a ratio of an energization time of the heater 60 per unit time, to the unit time. The heater 60 is energized by using an alternating voltage generated by the alternating-current power supply 30. The power-supply duty cycle represents a percentage of the effective voltage (average voltage) of the waveform of voltage applied to the heater 60, to the voltage from the alternating-current power supply 30. In a case where the phase control is performed, the power-supply duty cycle is a ratio of the energization time of the heater 60, energized by turning on a triac, to a half cycle of the waveform of voltage generated by the alternating-current power supply. In a case where the ON/OFF control is performed on a triac in each half-wave of the waveform of voltage generated by the alternating-current power supply (in the half-cycle duty control), the power-supply duty cycle is a ratio of the number of half-waves, at which the triac is turned on, to the number of half-waves that correspond to a period of a periodic ON/OFF pattern. In a case where the operation of the fixing unit 13 is started at a normal temperature, the power-supply duty cycle is normally 100% in a period of time from when the energization is started in the fixing-unit warm-up sequence S100, until when the fixing-unit warm-up sequence S100 is ended.

A solid line of FIG. 5A represents a warm-up temperature curve obtained in a case where the image forming apparatus 1 that includes the fixing unit 13 that was new was connected to an alternating-current power supply 30 of 100 V. A broken line represents a warm-up temperature curve obtained in a case where the image forming apparatus 1 that includes the fixing unit 13 that was new was connected to an alternating-current power supply 30 of 120 V. The film thickness of the surface layer of the fixing film 14 of the new fixing unit 13 was 14 μm.

For comparison, FIG. 5A also illustrates a warm-up temperature curve obtained in a case where the fixing unit 13 had been used until 80% of its service life was reached. A dot-dot-dash line of FIG. 5A represents a warm-up temperature curve obtained in a case where the fixing unit 13 had been used until 80% of its service life was reached, and where the image forming apparatus 1 that includes the fixing unit 13 was connected to an alternating-current power supply 30 of 100 V. In addition, a dot-dash line represents a warm-up temperature curve obtained in a case where the fixing unit 13 had been used until 80% of its service life was reached, and where the image forming apparatus 1 that includes the fixing unit 13 was connected to an alternating-current power supply 30 of 120 V In the state where the fixing unit 13 had been used until 80% of its service life was reached, the film thickness of the surface layer of the fixing film 14 was smaller than the initial film thickness due to the wear of the fixing film 14 caused by the use of the fixing film 14, and was 2 μm.

As illustrated in FIG. 5A, if the state of the fixing unit 13 is constant, the maximum value of the slope of the warm-up temperature curve increases as the voltage of the alternating-current power supply 30 increases. In addition, if the state of the fixing unit 13 is constant, the temperature at a point of time increases as the voltage of the alternating-current power supply 30 increases. This is because the power consumed in the heat-generating resistance layer of the heater 60 increases as the voltage increases, increasing the amount of heat generated by the heater 60. Note that the change in the power consumption is caused also by variations in the resistance value of the heat-generating resistance layer of the heater 60, which are produced in the manufacturing. Thus, the amount of heat generated by the heater is changed also by the variations in the resistance value of the heat-generating resistance layer of the heater 60. If the voltage of the alternating-current power supply 30 is constant, the power consumption increases as the resistance value of the heat-generating resistance layer of the heater 60 decreases. Thus, the maximum value of the slope of the warm-up temperature curve and the temperature at a point of time increase as the resistance value of the heat-generating resistance layer of the heater 60 decreases.

Since the warm-up temperature curve is changed, as described above, by the power consumed in the heat-generating resistance layer of the heater 60, the power consumed in the heat-generating resistance layer of the heater 60 can be estimated, based on the information on the warm-up temperature curve. In the power-consumption determination (S302) of the present embodiment, the power consumed in the heat-generating resistance layer of the heater 60 (hereinafter referred to as a power consumption Pw (W)) is estimated by using the temperature information obtained in a time period Per2 (i.e., a second predetermined time period), and by using the following Equation 1. The time period Per2 corresponds to a part of the warm-up temperature curve illustrated in FIG. 5.

$$Pw=k_1\times(Th_{2e}-Th_{2s})+k_2 \qquad \text{Equation 1:}$$

In Equation 1, a parameter $Th_{2e}$ is a temperature detected by the thermistor 62 at the end timing (i.e., $t_{2e}$ in FIG. 5A) of the time period Per2. In addition, a parameter $Th_{2s}$ is a temperature detected by the thermistor 62 at the start timing (i.e., $t_{2s}$ in FIG. 5A) of the time period Per2. For example, the time period Per2 starts at a time at which 0.8 seconds has elapsed since the start of the power supply to the heater 60, and ends at a time at which 1.3 seconds has elapsed since the start of the power supply to the heater 60. A parameter $k_1$ is a coefficient of 38.46 W/° C., and a parameter $k_2$ is a constant of −219.0 W.

The temperature $Th_{2s}$ is an example of a first temperature. The first temperature is a temperature of the heating member at a first timing ($t_{2s}$) in a period of time in which the heating member is heated in the warm-up processing (i.e., the fixing-unit warm-up sequence) for the fixing unit 13. The temperature $Th_{2e}$ is an example of a second temperature. The second temperature is a temperature of the heating member at a second timing ($t_{2e}$) that is in the period of time and that is later than the first timing ($t_{2s}$).

For increasing the accuracy of determining the power consumption Pw, it is preferable to determine the power consumed in a period of time in which the warm-up temperature curve changes significantly such that the difference in the power consumption Pw has a larger value. Thus, it is preferable that the time period Per2 be set such that the time period Per2 includes a time period in which the slope of the warm-up temperature curve (that corresponds to the temperature-rise speed) has the maximum value. In other words, the first timing and the second timing are set in advance such that the time period therebetween includes a time period in which a temperature rise value of the heating member per unit time becomes maximum in a case where the warm-up processing is started when the heating member has a room temperature.

Next, a method of the film-thickness determination (S303) will be described in detail with reference to FIGS. 5A and 5B. As illustrated in FIG. 5A, if the voltage of the alternating-current power supply 30 is constant, the temperature represented by the warm-up temperature curve decreases at a point of time as the thickness of the surface layer of the fixing film 14 decreases. This is because the heat of the heater 60 easily moves to the film surface if the surface layer is thin. That is, in a case where the same fixing unit 13 is used and the voltage of the alternating-current power supply 30 is constant, the amount of heat generated by the heater 60 is constant, but the amount of heat dissipated from the film surface (that includes the amount of heat conducted to the pressing roller 15) increases as the surface layer of the fixing film 14 becomes thinner. Thus, if the surface layer of the fixing film 14 is thin (2 μm), the temperature represented by the warm-up temperature curve at a point of time becomes lower than the temperature, represented by the warm-up temperature curve at the point of time, obtained for a surface layer of the fixing film 14 having a larger thickness (14 μm).

For this reason, the film thickness of the surface layer of the fixing film 14 can be estimated with high accuracy, based on the temperature rise value in a period of time, for example, from the end timing $t_{2e}$ of the time period Per2 (i.e., the timing at which the second predetermined time period ends) until the end timing $t_{1e}$ of the determination time period Per1 (i.e., a predetermined timing).

Since the warm-up temperature curve is changed, as described above, by the thickness of the surface layer of the fixing film 14, the thickness of the surface layer of the fixing film 14 can be estimated, based on the information on the warm-up temperature curve. In the film-thickness determination (S303) of the present embodiment, a film thickness D (μm) of the surface layer of the fixing film 14 is estimated by using the following Equation 2.

$$D=k_3\times Pw+k_4\times(Th_{1e}-Th_{2e})+k_5 \qquad \text{Equation 2:}$$

In Equation 2, a parameter Pw is power consumed in the heat-generating resistance layer of the heater 60, which is determined in the power-consumption determination (S302). In addition, a parameter $Th_{1e}$ is a temperature detected by the thermistor 62 at the end timing (i.e., $t_{1e}$ in FIG. 5A) of the determination time period Per1. For example, the end timing $t_{1e}$ of the determination time period Per1 is set at a time at which 2.4 seconds has elapsed since the start of the power supply to the heater 60. In the present embodiment, a parameter $k_3$ is a coefficient of −0.139 μm/W, a parameter $k_4$ is a coefficient of 3.15 μm/° C., and a parameter $k_5$ is a constant of −27.4 μm.

The temperature $Th_{1e}$ is an example of a third temperature, and the third temperature is a temperature of the heating member at the timing ($t_{1e}$) that is different from the first timing and the second timing. In the first embodiment and the below-described second and third embodiments, the third temperature is a temperature of the heating member at the third timing ($t_{1e}$), which is in a period of time in which the heating member is heated in the warm-up processing for the fixing unit 13, and which is later than the second timing. By using the third temperature obtained at the third timing, the control based on the film thickness of the fixing film 14 can be performed. In the present embodiment, the fixing temperature, which is one example of the fixing condition, is changed, based on the information on the warm-up temperature curve (i.e., $Th_{2s}$, $Th_{2e}$, and $Th_{1e}$).

The change in the warm-up temperature curve, caused by the difference in the thickness of the surface layer of the fixing film 14, gradually increases after the period of time in which the slope of the warm-up temperature curve becomes maximum. This is because the difference, in the amount of stored heat, between the heater 60 and a component around the heater 60 increases with time. The difference in the amount of stored heat is produced due to the difference, in the amount of dissipated heat, between the heater 60 and the component around the heater 60. Thus, it is preferable that the end timing of the determination time period Per1 be set at a timing delayed, as much as possible, from the period of time in which the slope of the warm-up temperature curve becomes maximum, in the fixing-unit warm-up sequence.

Note that the temperature $Th_{1e}$ may not be obtained at a single timing (i.e., a predetermined timing) on the time axis. For example, the temperature $Th_{1e}$ may be an average temperature obtained in a period of time from when 2.3 seconds has elapsed since the start of the power supply to the heater 60, until when 2.5 seconds has elapsed since the start of the power supply to the heater 60.

As described above, in the determination (S106) of the state of the fixing unit of the present embodiment, the control portion 40 estimates the film thickness D of the surface layer of the fixing film 14, based on the information on the warm-up temperature curve; and determines that as the film thickness D is smaller, the fixing unit 13 has been used more frequently and the fixing unit is reaching its service life.

Note that, for example, if the voltage of the alternating-current power supply 30 has an extremely high value, the temperature of the heater 60 may reach the warm-up temperature Tc1 before the determination time period Per1 ends. In this case, the power-supply duty cycle may become lower than 100% before the determination time period Per1 ends. In addition, if the image forming apparatus 1 performs another printing operation immediately before the fixing-unit warm-up sequence S100, the fixing unit 13 is preheated. Thus, also in this case, the temperature of the heater 60 may reach the warm-up temperature Tc1 and the power-supply duty cycle may become lower than 100% before the determination time period Per1 ends.

In such a case, it becomes difficult to distinguish the case where the change in the warm-up temperature curve is caused by the change in the thickness of the surface layer of the fixing film 14, from the case where the change in the warm-up temperature curve is caused by the change in the power-supply duty cycle. Thus, the calculation for the film-thickness determination (S303) becomes inaccurate. Thus, if the power-supply duty cycle is not 100% in at least one part of the determination time period Per1, the control portion 40 does not perform the power-consumption determination (S302) and the film-thickness determination (S303), which are otherwise performed by using a current warm-up temperature curve, under the branch condition of S301. In this case, the control portion 40 uses a result of the film-thickness determination, in S304, performed in the previous determination (S106) of the state of the fixing unit.

The above description can be made in other words. That is, if energization rate of the heating member is the predetermined value over a predetermined period of time in which the warm-up processing is performed in a current job, the control portion sets the fixing condition used in the current job, based on the first temperature, the second temperature, and the third temperature detected in the warm-up processing. If the energization rate of the heating member is not the predetermined value in at least one part of the predetermined period of time, the control portion sets the fixing condition used in the current job, by using a set value stored in a storage portion. With this operation, it is possible to reduce the possibility that the fixing condition changes unsuitably due to the change in the warm-up temperature curve, caused by the preheating of the fixing unit 13.

Next, a method of correcting the fixing temperature Tc2 in accordance with the state of the fixing unit, determined in S106, will be described. The fixing temperature Tc2 is used in the sheet passage sequence. As described above, the control portion 40 reads the reference value information of the fixing temperature Tc2 (S201), and corrects the reference value information in accordance with the environmental temperature and the state of the fixing unit.

In the present embodiment, the amount of temperature correction ΔT is calculated by using the following Equation 3, such that the fixing temperature Tc2 decreases as the film thickness D, determined in S106, decreases (that is, as the thickness of the surface layer of the fixing film 14 decreases).

$$\Delta T=k_6\times(D-14) \quad \text{Equation 3:}$$

In Equation 3, a parameter $k_6$ is a coefficient, and in the present embodiment, the parameter $k_6$ is 1.0° C./μm.

The fixing temperature Tc2 is the sum of the reference value of the fixing temperature (or a value obtained by correcting the reference value in accordance with the environmental temperature) and the amount of temperature correction ΔT.

FIG. 6 illustrates a result of an experiment in which the fixing temperature Tc2 was forced to have a predetermined value for checking whether the image defect occurs. The experiment was conducted in an environment with a temperature of 23° C. (room temperature, normal temperature). The result is indicated by a circle used in a case where no image defect occurred, a white triangle used in a case where the heat was excessive and the hot offset occurred, and a black triangle used in a case where the heat was insufficient and the failure of fixing occurred.

In the present embodiment, the reference value of the fixing temperature Tc2 is set at 192° C., and the amount of environmental-temperature correction is 0° C. at the temperature of 23° C. Thus, the fixing temperature Tc2 used in the sheet passage sequence and corrected in accordance with the state of the fixing unit by using Equation 3 is 192° C. if the film thickness D of the surface layer of the fixing film 14 is 14 μm, 188° C. if the film thickness D is 10 μm, 184° C. if the film thickness D is 6 μm, and 180° C. if the film thickness D is 2 μm. As can be seen from FIG. 6, since the fixing temperature Tc2 was controlled based on Equation 3, no image defects occurred regardless of the film thickness of the surface layer of the fixing film 14.

In a comparative example 1, the correction of the fixing temperature Tc2 in accordance with the state of the fixing unit was not performed, for comparison. In the comparative example 1, the fixing temperature Tc2 in the sheet passage sequence was set at 192° C., regardless of the film thickness of the surface layer of the fixing film 14. Thus, as illustrated in FIG. 6, when the film thickness of the surface layer of the fixing film 14 was 2 μm, the heat was excessive and the hot offset occurred.

(5) Summary of the Present Embodiment

As described above, the control portion of the present embodiment changes the fixing temperature Tc2, which is an example of the fixing condition used in the job, based on the first temperature, the second temperature, and the third temperature detected by temperature detection portion. Thus, the control portion can set a more appropriate fixing condition (i.e., the fixing temperature Tc2) in accordance with the state of the fixing unit 13, in a simple configuration that does not need any additional component, such as another temperature detection portion; and can improve the performance of the image forming apparatus 1. Note that as described in the below-described second to sixth embodiments, the fixing condition changed by the control portion is not limited to the fixing temperature Tc2.

In the present embodiment, the control portion is configured to determine a thickness of the fixing member, based on the first temperature, the second temperature, and the third temperature; and change fixing condition used in the job, in accordance with a determination result of the thickness of the fixing member. Thus, the control portion can change the fixing condition in accordance with the wear of the fixing member in the simple configuration, and can improve the performance of the image forming apparatus 1.

In the present embodiment, the control portion determines the state of the fixing unit 13 (i.e., the film thickness D of the surface layer of the fixing film 14), based on the warm-up temperature curve of the heater 60; and corrects the fixing temperature Tc2, based on the determination result. As expressed by Equation 2, the determination of the film thickness D depends on the power consumption Pw of the heater 60 and the temperature ($Th_{1e}$) of the heater 60 obtained at the predetermined timing ($t_{1e}$) in the determination time period Per1 (i.e., the predetermined period of time). That is, the control portion changes the target temperature of the heating member in a case where the image is fixed to the recording material, in accordance with the power consumption of the heating member and a temperature of the heating member detected by the temperature detection portion. The temperature of the heating member is detected at a predetermined timing in the predetermined period of time if the heating member is energized at a predetermined energization rate over a predetermined period of time before the recording material reaches the fixing unit. In other words, the control portion is configured to determine the power consumption of the heating member by using a temperature rise value from the first temperature to the second temperature; and determine the thickness of the fixing member by using the determination result of the power consumption and a temperature rise value from the second temperature to the third temperature. Thus, the control portion can more appropriately determine the degree of wear of the fixing member.

In the present embodiment, the control portion is configured to change the fixing temperature such that the fixing temperature in a case where the thickness of the fixing member is a second thickness smaller than a first thickness is lower than the fixing temperature in a case where the thickness of the fixing member is the first thickness.

In this manner, the control portion can reduce the occurrence of the hot offset over the service life of the fixing unit 13. Thus, in the present embodiment, it is possible to provide the image forming apparatus that can appropriately deal with the wear of the fixing member in the simple configuration. In addition, in comparison with the comparative example 1, since the image forming apparatus of the present embodiment can lower the fixing temperature Tc2 in some cases while keeping excellent fixing property, the image forming apparatus has better energy-saving performance.

As can be seen from Equation 2, if the power consumption Pw of the heater 60 is constant, the film thickness D is determined smaller and the fixing temperature Tc2 is set lower as the temperature ($Th_{1e}$) of the heater 60 at the predetermined timing ($t_{1e}$) in the determination time period Per1 (i.e., the predetermined period of time) decreases. Specifically, in a case where the power consumption of the heating member is constant, the control portion sets the target temperature at a first temperature when the detected temperature of the heating member is a first value. In addition, the control portion sets the target temperature at a second temperature lower than the first temperature when the detected temperature of the heating member is a second value smaller than the first value.

In this manner, the control portion can appropriately determine the film thickness D by using the change in heat transfer property of the fixing film 14, which is caused by the change in the film thickness D; and can effectively reduce the occurrence of the hot offset.

In addition, as can be seen from Equation 2, if the temperature ($Th_{1e}$) of the heater 60 at the predetermined timing ($t_{1e}$) in the determination time period Per1 (i.e., the predetermined period of time) is constant, the film thickness D is determined smaller and the fixing temperature Tc2 is set lower as the power consumption Pw of the heater 60 decreases. Specifically, in a case where the detected temperature of the heating member is constant, the control portion sets the target temperature at a first temperature when the power consumption of the heating member is a first power consumption. In addition, the control portion sets the target temperature at a second temperature lower than the first temperature when the power consumption of the heating member is a second power consumption smaller than the first power consumption.

In this manner, the control portion can appropriately determine the film thickness D and can effectively reduce the occurrence of the hot offset even if the amount of heat generated by the heater 60 differs in the fixing-unit warm-up sequence, for example, due to the difference in power-supply voltage.

In the present embodiment, if the temperature rise value is constant in the time period Per2, the film thickness D is determined smaller and the fixing temperature Tc2 is set lower as the temperature rise value obtained in a period of time from the end of the time period Per2 to the end of the determination time period Per1 decreases. In addition, if the temperature rise value obtained in the period of time from the end of the time period Per2 to the end of the determination time period Per1 is constant, the film thickness D is determined smaller and the fixing temperature Tc2 is set lower as the temperature rise value obtained in the time period Per2 decreases. The above description can be made in other words. That is, the fixing temperature in a case where a temperature rise value from the first temperature to the second temperature is a first value and where a temperature rise value from the second temperature to the third temperature is a second value is a first fixing temperature. In addition, the fixing temperature in a case where a temperature rise value from the first temperature to the second temperature is a third value smaller than the first value and where a temperature rise value from the second temperature to the third temperature is the second value is a second fixing temperature. In addition, the fixing temperature in a case where a temperature rise value from the first temperature to the second temperature is the first value and where a temperature rise value from the second temperature to the third temperature is a fourth value smaller than the second value is a third fixing temperature. In this case, the control portion changes the fixing temperature such that the second fixing temperature is lower than the first fixing temperature and the third fixing temperature is lower than the first fixing temperature. With this operation, the control portion can set an appropriate fixing temperature in accordance with the degree of wear of the fixing film 14, in consideration of the difference in power consumption of the heater 60.

As described above, in the present embodiment, the control portion appropriately determines the film thickness D in accordance with the difference in power-supply voltage. That is, the control portion changes the target temperature of the heating member in a case where the image is fixed to the recording material, in accordance with the power-supply voltage of the power supply connected with the image forming apparatus and a temperature of the heating member detected by the temperature detection portion. The temperature of the heating member is detected at a predetermined timing in the predetermined period of time if the heating member is energized at a predetermined energization rate over a predetermined period of time before the recording material reaches the fixing unit.

In this manner, the control portion can appropriately determine the film thickness D and effectively reduce the occurrence of the hot offset even if the amount of heat generated by the heater 60 differs in the fixing-unit warm-up sequence due to the difference in power-supply voltage.

Second Embodiment

Next, a second embodiment will be described. In the second embodiment, the rotation of the pressing roller 15 is started, in the fixing-unit warm-up sequence, after the time period Per2 ends. The configuration and the basic operation of the image forming apparatus are the same as those of the image forming apparatus of the first embodiment. Hereinafter, a component given a reference symbol identical to a reference symbol of a component of the first embodiment has the same structure and effect as those of the component of the first embodiment, unless otherwise specified.

Figure 7:
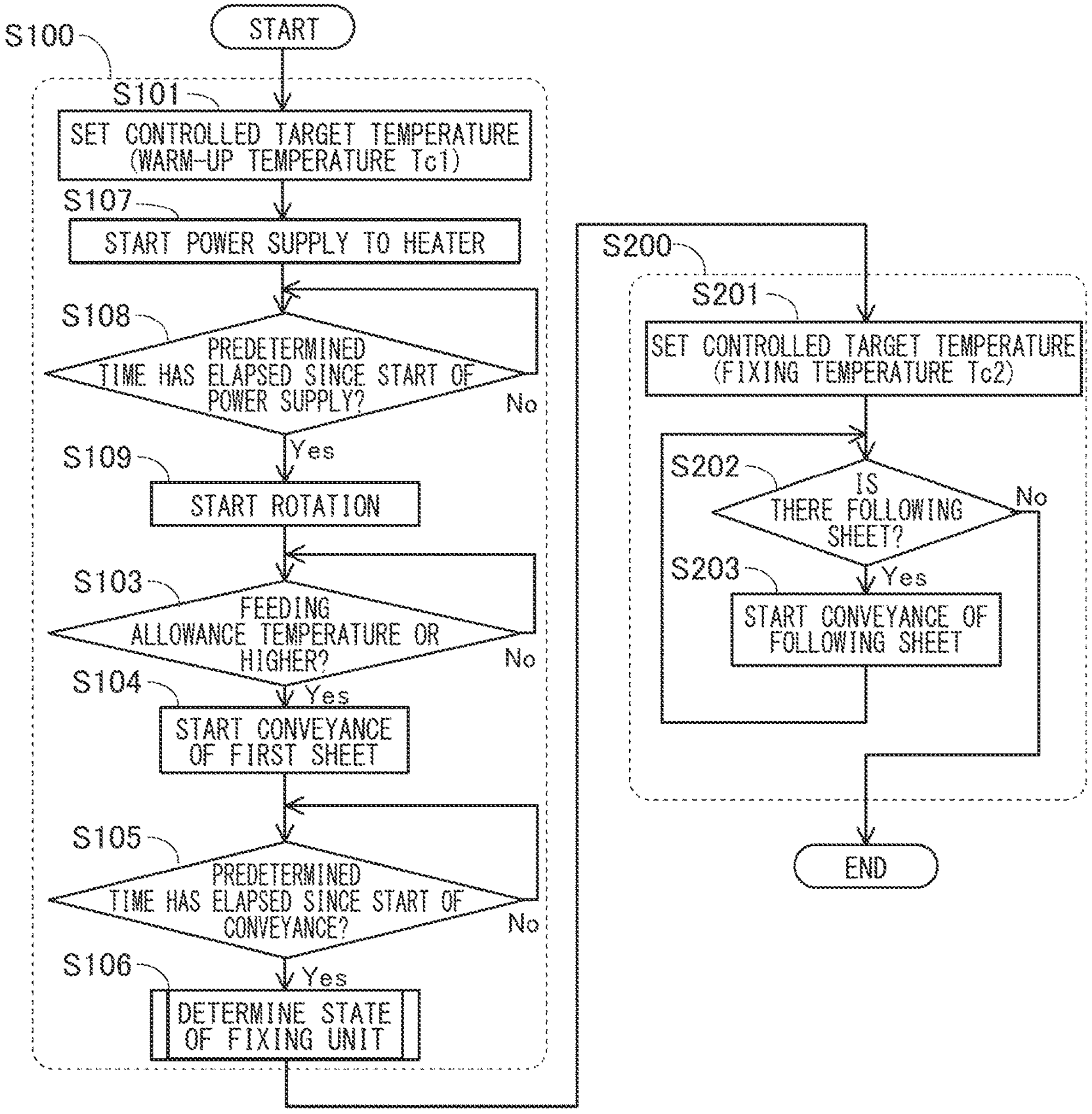
FIG. 7 is a flowchart illustrating control of a second embodiment.
Figure 8A:
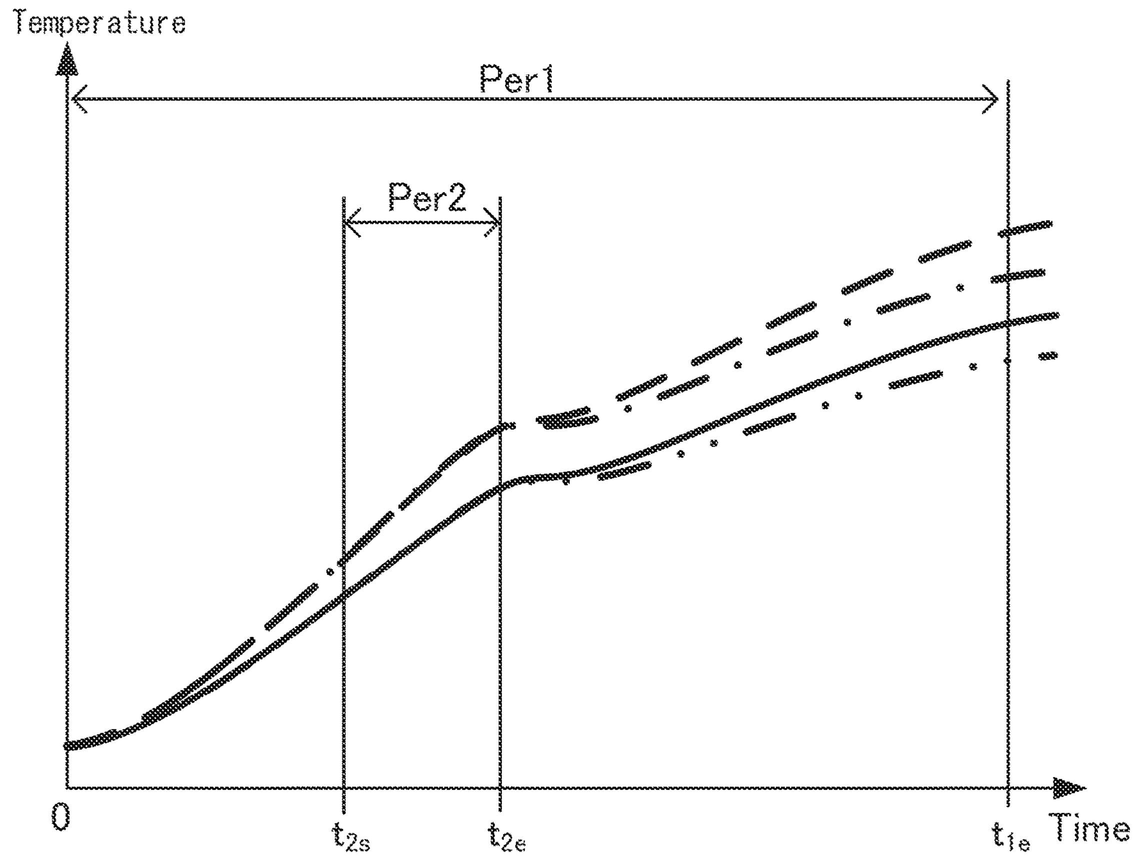
FIG. 8A is a graph illustrating an example of a warm-up temperature curve of the second embodiment.
Figure 8B:
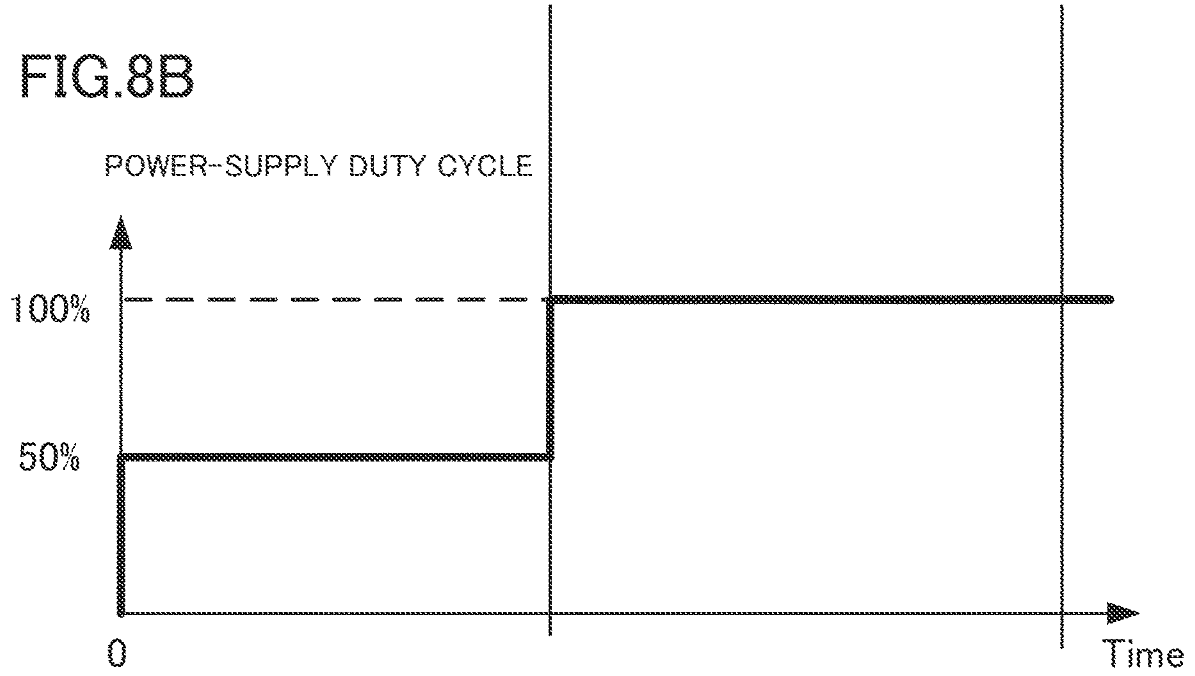
FIG. 8B is a graph illustrating an example of a power-supply duty cycle of the second embodiment.

The operation in the second embodiment will be described with reference to a flowchart of FIG. 7 and FIGS. 8A and 8B. FIG. 8A illustrates an example of the warm-up temperature curve obtained in a fixing-unit warm-up sequence S100 in a case where the operation of the fixing unit 13 was started at a normal temperature. FIG. 8B is the power-supply duty cycle that corresponds to the warm-up temperature curve illustrated in FIG. 8A. In the fixing-unit warm-up sequence S100 of the second embodiment, steps S107 to S109 are executed instead of the step S102 (FIG. 3) of the first embodiment.

After the setting (S101) of the warm-up temperature Tc1, the energization of the heater 60 is started and the fixing unit 13 starts to warm (S107). At the start of the energization, the power-supply duty cycle is fixed at 50%, instead of being controlled such that the temperature of the heater 60 approaches the warm-up temperature Tc1.

After a predetermined period of time has elapsed since the start of the energization (S108), the rotation of the pressing roller 15 is started (S109). In the second embodiment, the rotation of the pressing roller 15 is started when 1.1 seconds has elapsed since the start of the power supply to the heater 60. In addition, the control of the power-supply duty cycle is changed from the control that has fixed the power-supply duty cycle at 50%, to the control that adjusts the power-supply duty cycle such that the temperature of the heater 60 approaches the warm-up temperature Tc1. In a case where the operation of the fixing unit 13 is started at a normal temperature, the power-supply duty cycle used in and after S109 is 100%.

After the execution of S109, the control portion 40 determines whether the temperature detected by the thermistor 62 reaches a feeding allowance temperature (S103). After S103, the control portion 40 performs the same operations as those of the first embodiment.

In the second embodiment, a period of time from when the power supply to the heater 60 is started, until when 2.4 seconds has elapsed since the start of the power supply to the heater 60 is set as the determination time period Per1. In addition, a period of time from when 0.7 seconds has elapsed since the start of the power supply to the heater 60, until when 1.1 seconds has elapsed since the start of the power supply to the heater 60 is set as the time period Per2.

The power consumption Pw of the heater 60 is estimated by using Equation 1, as in the first embodiment. In the present embodiment, the parameter $k_1$ is 37.25 W/° C., and the parameter $k_2$ is −221.3 W. In addition, the film thickness D (μm) of the surface layer of the fixing film 14 is estimated by using Equation 2, as in the first embodiment. In the present embodiment, the parameter $k_3$ is −0.102 μm/W, the parameter $k_4$ is 3.31 Nm/° C., and the parameter $k_5$ is −15.2 μm. Thus, depending on Equation 3, the fixing temperature Tc2 is corrected by using the film thickness D estimated in this manner, as in the first embodiment.

In the second embodiment, since the pressing roller 15 is in a stop state until the time period Per2 ends, the warm-up temperature curve is hardly affected by the difference in the amount of heat dissipated from the film surface, which is caused by the difference in the film thickness of the surface layer of the fixing film 14. Thus, the slope of the warm-up temperature curve largely depends on the amount of heat generated by the heater 60. For this reason, the power consumption Pw of the heater 60 can be estimated with high accuracy, based on the temperature detected in the time period Per2. In contrast, since the pressing roller 15 is rotated after the time period Per2 ends, the heat dissipation from the film surface is facilitated, so that the warm-up temperature curve is obviously affected by the difference in the film thickness of the surface layer of the fixing film 14. As a result, the film thickness of the surface layer of the fixing film 14 can be estimated with high accuracy, based on the temperature rise value in a period of time from the end timing ($t_{2e}$) of the time period Per2, to the end timing ($t_{1e}$) of the determination time period Per1.

That is, the control portion of the present embodiment is configured not to rotate the fixing member in a period of time from the first timing to the second timing in the warm-up processing, and is configured to rotate the fixing member after the second timing. With this operation, the control portion can increase the accuracy of determining the thickness of the fixing member.

As described above, even in the configuration in which the rotation of the pressing roller 15 is started after the time period Per2 ends, the control portion can reduce the occurrence of the hot offset over the service life of the fixing unit 13, as in the first embodiment. In addition, since the control portion can make the fixing temperature Tc2 lower than that in the comparative example 1, the image forming apparatus has better energy-saving performance.

Note that the power supply to the heater 60 may be started in a state where the pressing roller 15 is stopped, then the rotation of the pressing roller 15 may be started when a predetermined time has elapsed, and then the time period Per2 may start after the rotation of the pressing roller 15 is started.

Third Embodiment

Next, a third embodiment will be described. In the third embodiment, based on the state of the fixing unit determined in S106, a threshold temperature $T_{th}$ used for the control (i.e., the control for reducing the temperature rise in the non-sheet passing area) for reducing the temperature rise in the non-sheet passing area is corrected. The configuration of the image forming apparatus and the basic configuration and operation of the fixing unit are the same as those of the first embodiment. Hereinafter, a component given a reference symbol identical to a reference symbol of a component of the first embodiment has substantially the same structure and effect as those of the component described in the first embodiment, unless otherwise specified, and features different from the features of the first embodiment will be mainly described.

Figure 11A:
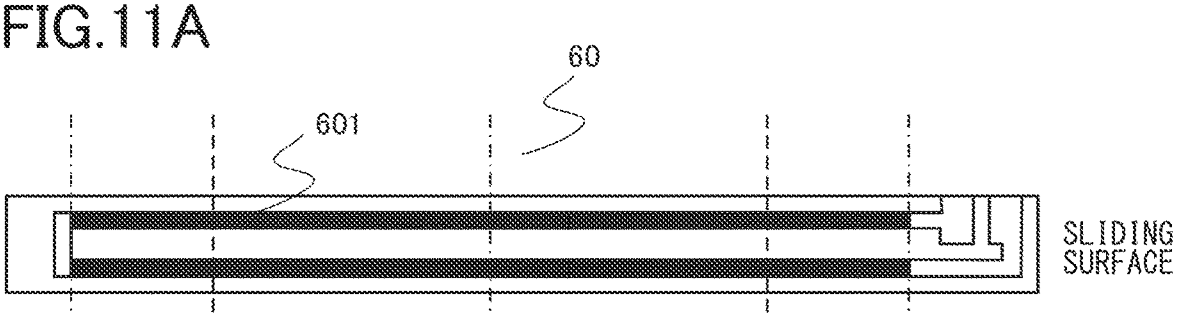
FIG. 11A is a diagram illustrating a configuration of a heater of the third embodiment.
Figure 11B:
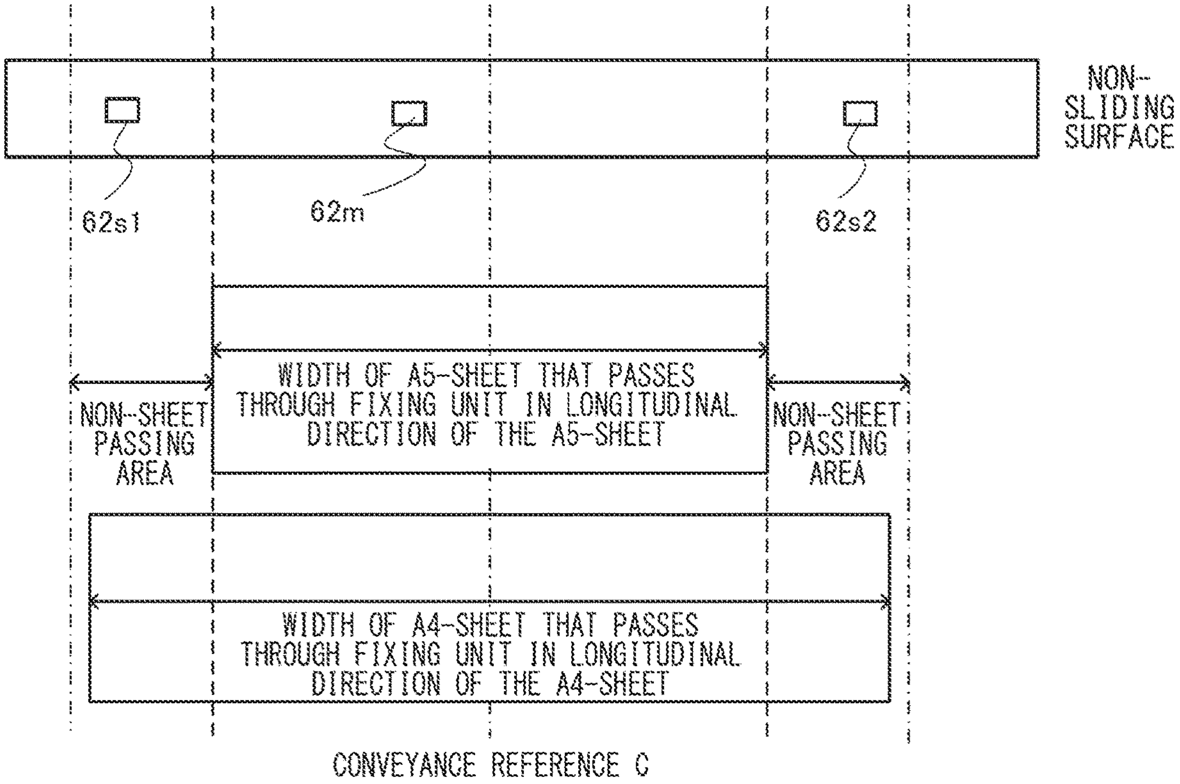
FIG. 11B is a diagram illustrating the configuration of the heater of the third embodiment.

FIG. 11 is a diagram illustrating a configuration of the heater 60 of the present embodiment, viewed in a longitudinal direction of the heater 60; and arrangement of a main-thermistor 62*m* and sub-thermistors 62*s*1 and 62*s*2, viewed in the longitudinal direction of the heater 60. The longitudinal direction of the heater 60 is equal to the rotation-axis direction of the fixing film 14 and the pressing roller 15. The main-thermistor 62*m* is an example of a temperature detection portion (i.e., a first temperature-detection portion) used for the energization control, which is performed for keeping the temperature of the heater 60 at the controlled target temperature. The sub-thermistors 62*s*1 and 62*s*2 are a second temperature-detection portion used for the control for reducing the temperature rise in the non-sheet passing area.

In the heater 60 of the present embodiment, a heat-generating resistance layer 601 that serves as a heat generating resistor is formed on a surface of the board that slides on the fixing film. The longitudinal width of the heat-generating resistance layer 601 is 220 mm. The heat-generating resistance layer 601 has a length of 110 mm on the right side with respect to a conveyance reference C, and a length of 110 mm on the left side with respect to the conveyance reference C. The conveyance reference C is positioned at a center of the heat-generating resistance layer 601 in the longitudinal direction. The conveyance reference C is a reference of the position that the recording material passes, and the reference of the position is set in the width direction of the recording material (i.e., the longitudinal direction of the heater 60). The image forming apparatus is configured so that a recording material is conveyed in a state where the center portion of the recording material is aligned with the conveyance reference C, regardless of the size of the recording material.

The main-thermistor 62*m* and the sub-thermistors 62*s*1 and 62*s*2 are disposed so as to be in contact with a surface of the board of the heater 60 that is opposite to the heat-generating resistance layer 601. The main-thermistor 62*m* detects the temperature of the heater 60, regardless of the size of the recording material, in an area that the recording material passes.

The sub-thermistors 62*s*1 and 62*s*2 (i.e., a second temperature detection portion) are disposed outside the main-thermistor 62*m* (i.e., a first temperature-detection portion) in the longitudinal direction of the heater 60 (i.e., the rotation-axis direction of the fixing film 14). The sub-thermistors 62*s*1 and 62*s*2 are disposed in an end area (i.e., a non-sheet passing area) that a recording material having a smaller width does not pass. For example, an A5-sheet that passes through the fixing unit in the longitudinal direction of the A5-sheet (that is, an A5-sheet that is fed in a direction along the long side of the A5-sheet) does not pass the end area. The sub-thermistors 62*s*1 and 62*s*2 are used for the control performed for reducing a problem (e.g., temperature rise in a non-sheet passing area) caused by the excessive temperature rise of the fixing film 14 in the non-sheet passing area.

In the example illustrated in FIG. 11, the main-thermistor 62*m* is disposed at a position separated from the conveyance reference C by 23 mm in the longitudinal direction, and each of the sub-thermistors 62*s*1 and 62*s*2 is disposed at a position separated from the conveyance reference C by 99 mm.

(1) Flow for Setting Threshold Temperature Used in Control for Reducing Temperature Rise in Non-Sheet Passing Area Next, an operation for setting the control for reducing the temperature rise in a non-sheet passing area, performed in the third embodiment, will be described with reference to a flowchart of FIG. 10.

If a print signal is sent to the image forming apparatus 1, the control portion 40 starts a fixing-unit warm-up sequence S100. The fixing-unit warm-up sequence S100, and the determination (S106) of the state of the fixing unit performed in the fixing-unit warm-up sequence S100 are the same as those of the first embodiment (FIGS. 3 and 4).

After the fixing-unit warm-up sequence S100, a sequence (S400) for reducing the temperature rise in the non-sheet passing area is started. The sequence (S400) for reducing the temperature rise in the non-sheet passing area is a sequence for keeping the temperature of a member located in the non-sheet passing area, at or below an allowable temperature when the printing operation is performed on a recording material having a narrow width.

For example, if A5-size recording materials whose width (148 mm) is narrower than the longitudinal width (220 mm) of the heat-generating resistance layer 601, as illustrated in FIG. 11, successively pass through the fixing unit in the longitudinal direction of the A5-size recording materials, the temperature of the fixing film 14 and the pressing roller 15 increases in the non-sheet passing area which the recording material does not pass through. In the present embodiment, the allowable temperature of the pressing roller 15 is set at 200° C. in consideration of the heat resistance property and the change in hardness of the pressing roller 15. Thus, the temperature of the pressing roller 15 is kept at or below 200° C. in the continuous printing operation. That is, the upper limit of the surface temperature of the pressing roller 15 in the printing operation is set at 200° C. Note that the allowable temperature may be set in consideration of the heat resistance property of another member of the fixing unit, such as the fixing film 14, other than the pressing roller 15.

In the sequence (S400) for reducing the temperature rise in the non-sheet passing area, the control portion 40 initially sets the threshold temperature $T_{th}$, which is used for performing the control for reducing the temperature rise in the non-sheet passing area by using the sub-thermistors (S401). In S401, the control portion 40 reads the information on a reference value of the threshold temperature $T_{th}$ (i.e., a reference threshold temperature) stored in the ROM 41*a*. The control portion 40 sets the threshold temperature $T_{th}$ used in the sequence for reducing the temperature rise in the non-sheet passing area, by correcting the reference value in accordance with the state of the fixing unit, which is determined in S106. The correction in accordance with the state of the fixing unit will be described in detail below.

After that, the control portion 40 compares, in S402, temperatures detected by the sub-thermistors 62*s*1 and 62*s*2, with the threshold temperature that is set in 4301. If both of the temperatures detected by the sub-thermistors 62*s*1 and 62*s*2 are equal to or lower than the threshold temperature $T_{th}$, then the control portion 40 proceeds to S404, and determines whether the printing operation is completed. If the printing operation is not completed, then the control portion 40 continues to perform the determination in S402.

If any of the temperatures detected by the sub-thermistors 62*s*1 and 62*s*2 is equal to or higher than the threshold temperature Tin, then the control portion 40 proceeds to S403, and performs throughput-down control, as the control for reducing the temperature rise in the non-sheet passing area.

In the present embodiment, if a printing operation is performed on A5-sheets that pass through the fixing unit in the longitudinal direction of the A5-sheets, the printing operation is started at a throughput of 40 sheets/minute. In the throughput-down control performed in S403, the throughput is decreased to 20 sheets/minute by increasing the interval at which the recording material passes through the fixing unit (i.e., the interval at which the sheets pass through the fixing unit) (S403). In the present embodiment, the throughput-down control is performed by adjusting the interval between timings at which the conveyance of the recording material P from the feeding tray 21 is started, without changing the conveyance speed of the recording material P.

The throughput-down control is performed as described above and the interval at which the sheets pass through the fixing unit is increased, so that the heat of the non-sheet passing area disperses toward the sheet passing area during the interval, and the temperature distribution of the pressing roller 15 in the longitudinal direction is smoothed (that is, the heat distribution is made uniform). As a result, the excessive temperature rise of the pressing roller 15 can be reduced in the non-sheet passing area.

After that, the control portion 40 determines in S404 whether the printing operation is completed. The control portion continues to perform the determination in S402 if the printing operation is being continued, or ends the sequence (S400) for reducing the temperature rise in the non-sheet passing area if the printing operation is completed.

Figure 10:
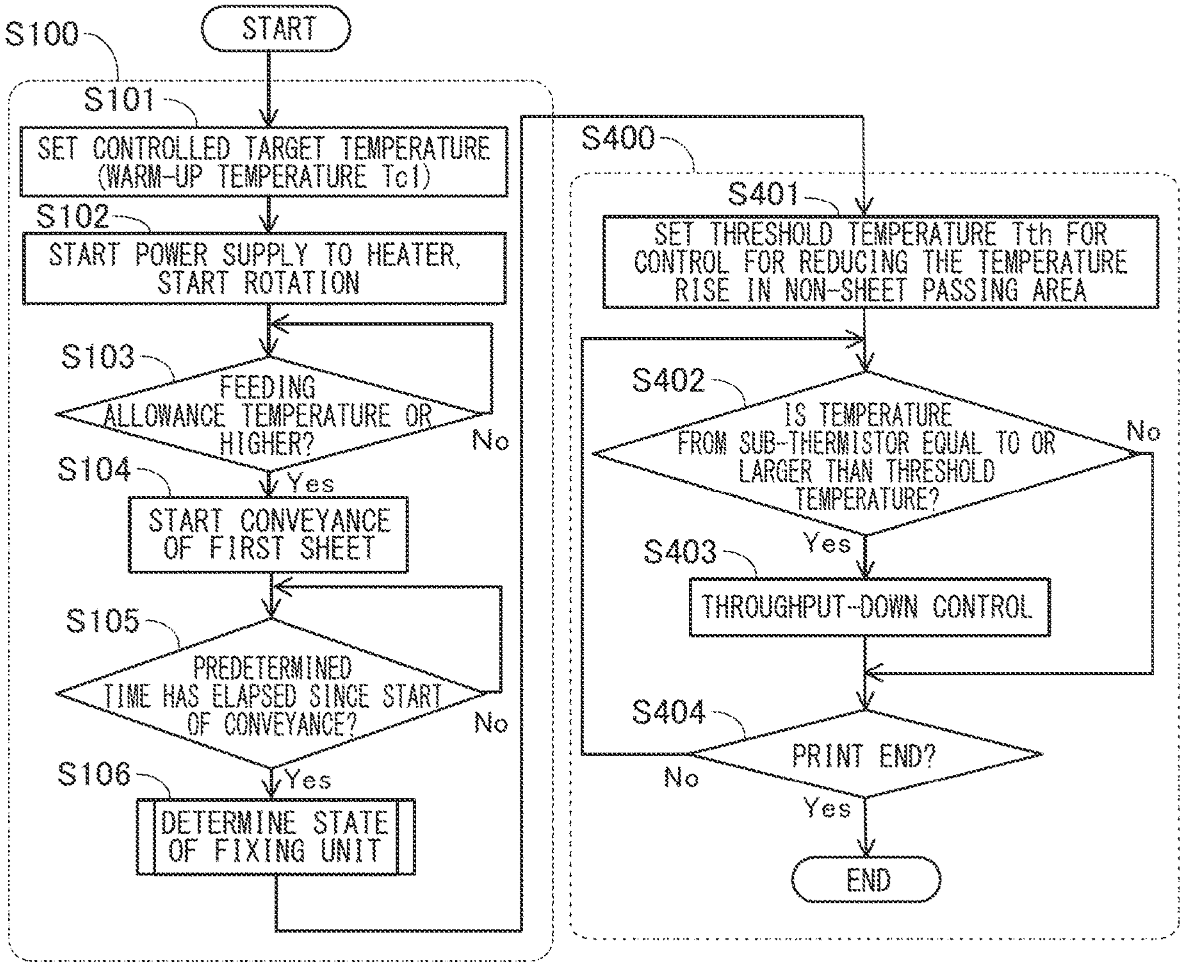
FIG. 10 is a flowchart illustrating control of a third embodiment.

(2) Determination of State of Fixing Unit and Correction of Threshold Temperature Since the determination (S106) of the state of the fixing unit, illustrated in the flowchart of FIG. 10, is the same as that in the first embodiment, the description thereof will be omitted. As described in the first embodiment, in the determination (S106) of the state of the fixing unit, the control portion 40 estimates the film thickness D of the surface layer of the fixing film 14, based on the information on the warm-up temperature curve; and determines that the fixing unit 13 has been used more frequently and the fixing unit is reaching its service life as the film thickness D is smaller.

Next, the relationship between the temperature detected by the sub-thermistors 62*s*1 and 62*s*2 and the surface temperature of the pressing roller 15 will be described with reference to FIG. 12. As described above, in the present embodiment, the printing operation is performed in a state where the surface temperature of the pressing roller 15 is kept at or below 200° C. However, there is a delay between the start of the control for reducing the temperature rise in the non-sheet passing area (i.e., the throughput-down control) and the start of reduction of the temperature rise in the non-sheet passing area. For this reason, the control for reducing the temperature rise in the non-sheet passing area is enabled at a point of time at which the surface temperature of the pressing roller 15 reaches 190° C., for keeping the surface temperature of the pressing roller 15 at or below 200° C. in the printing operation.

A solid line of FIG. 12A represents a relationship between the temperature detected by the sub-thermistors 62*s*1 and 62*s*2 and the surface temperature of the pressing roller 15 in an initial state of the fixing unit (in which the film thickness of the surface layer of the fixing film 14 is 14 μm). In this case, the surface temperature of the pressing roller 15 reaches 190° C. when the temperature detected by the sub-thermistors 62*s*1 and 62*s*2 is 238° C.

The uppermost broken line of FIG. 12A represents a relationship between the temperature detected by the sub-thermistors 62$s$1 and 62$s$2 and the surface temperature of the pressing roller 15 in a state where the fixing unit has been used until 80% of its service life is reached (the film thickness of the surface layer of the fixing film 14 is 2 μm in this state). In this case, the surface temperature of the pressing roller 15 reaches 190° C. when the temperature detected by the sub-thermistors 62$s$1 and 62$s$2 is 232° C.

In a case where the film thickness of the surface layer of the fixing film 14 is 10 the surface temperature of the pressing roller 15 reaches 190° C. when the temperature detected by the sub-thermistors 62$s$1 and 62$s$2 is 236° C. In addition, in a case where the film thickness of the surface layer of the fixing film 14 is 6 μm, the surface temperature of the pressing roller 15 reaches 190° C. when the temperature detected by the sub-thermistors 62$s$1 and 62$s$2 is 234° C.

As described above, as the film thickness of the surface layer of the fixing film 14 becomes smaller, the temperature that is detected by the sub-thermistors 62$s$1 and 62$s$2, and that corresponds to a certain surface temperature of the pressing roller 15 decreases. This is because if the thickness of the fixing film decreases, the heat easily moves from the heater 60 to the pressing roller 15 (that is, the thermal resistance decreases).

Thus, for keeping the surface temperature of the pressing roller 15 at or below the predetermined temperature, the threshold temperature $T_{th}$ for the temperature detected by the sub-thermistors 62$s$1 and 62$s$2, used for the control for reducing the temperature rise in the non-sheet passing area, is corrected in accordance with the film thickness of the surface layer of the fixing film 14.

Next, a method of correcting the threshold temperature $T_{th}$ in accordance with the state of the fixing unit, determined in S106, will be described. In the present embodiment, the amount of temperature correction ΔT is calculated by using the following Equation 4, such that the threshold temperature $T_{th}$ decreases as the film thickness D, determined in S106, decreases (that is, as the thickness of the surface layer of the fixing film 14 decreases).

$$\Delta T = k_{td} \times (D - 14) \quad \text{Equation 4:}$$

In Equation 4, a parameter $k_{td}$ is a coefficient, and in the present embodiment, the parameter $k_{td}$ is 0.5° C./μm. The threshold temperature $T_{th}$ is the sum of the reference value of the threshold temperature $T_{th}$ (referred to as a reference threshold temperature) and the amount of temperature correction ΔT.

In the present embodiment, the reference threshold temperature is 238° C. Thus, the threshold temperature $T_{th}$ in a case where the film thickness of the surface layer of the fixing film 14 is 14 μm is 238° C., the threshold temperature $T_{th}$ in a case where the film thickness of the surface layer of the fixing film 14 is 10 μm is 236° C., the threshold temperature $T_{th}$ in a case where the film thickness of the surface layer of the fixing film 6 is 6 μm is 234° C., and the threshold temperature $T_{th}$ in a case where the film thickness of the surface layer of the fixing film 14 is 2 μm is 232° C.

FIG. 12B illustrates a relationship between the temperature detected by the sub-thermistors 62$s$1 and 62$s$2, the surface temperature of the pressing roller 15, and the temperature at which the fixing unit of the present embodiment can be used. As illustrated in FIG. 12B, the threshold temperature $T_{th}$ is decreased as the film thickness D decreases, by changing the threshold temperature $T_{th}$, used for the control for reducing the temperature rise in the non-sheet passing area, in accordance with the film thickness D of the surface layer of the fixing film 14.

As described above, if the temperature detected by the sub-thermistors 62$s$1 and 62$s$2 becomes equal to or larger than the threshold temperature $T_{th}$, the control for reducing the temperature rise in the non-sheet passing area (i.e., the throughput-down control) is started. After the start of the control for reducing the temperature rise in the non-sheet passing area, the surface temperature of the pressing roller 15 increases slightly (in a control margin area). However, it is possible to prevent the surface temperature of the pressing roller 15 from reaching a temperature (equal to or larger than 200° C. in the present embodiment, at which the fixing unit cannot be used) at which the problem caused by the temperature rise in the non-sheet passing area becomes obvious.

Summary of the Present Embodiment

In the present embodiment, the threshold temperature $T_{th}$, used for the control for reducing the temperature rise in the non-sheet passing area, is controlled such that the threshold temperature $T_{th}$ decreases as the film thickness D of the fixing film 14 decreases. The control portion is configured to change the threshold temperature such that the threshold temperature in a case where the thickness of the fixing member is a second thickness smaller than a first thickness is lower than the threshold temperature in a case where the thickness of the fixing member is the first thickness. Thus, the control portion can change the fixing temperature, which is one example of the fixing condition, in accordance with the wear of the fixing member in the simple configuration; and can improve the performance of the image forming apparatus 1.

In the present embodiment, the control portion determines the state of the fixing unit 13 (i.e., the film thickness of the fixing film 14), based on the warm-up temperature curve; and corrects the threshold temperature $T_{th}$, used for the control for reducing the temperature rise in the non-sheet passing area, based on the determination result. That is, the control portion is configured to perform the control for reducing the temperature rise in the end area of the heating member if the temperature of the end area, detected by using the detection signal from the second temperature-detection portion, exceeds the threshold temperature. In addition, the control portion is configured to change the threshold temperature in accordance with the power consumption of the heating member and a temperature of the heating member detected by the first temperature detection portion. The temperature of the heating member is detected at a predetermined timing in a predetermined period of time if the heating member is energized at a predetermined energization rate over the predetermined period of time before the recording material reaches the fixing unit.

In this manner, it is possible to keep the surface temperature of the pressing roller 15 at or below a predetermined allowable temperature, and reduce the occurrence of the problem of the temperature rise in the non-sheet passing area. Thus, also in the present embodiment, it is possible to provide the image forming apparatus that can appropriately deal with the wear of the fixing member in the simple configuration.

As can be seen from Equation 2, if the power consumption Pw of the heater 60 is constant, the film thickness D is determined smaller and the threshold temperature Tin is set lower as the temperature ($Th_{1e}$) of the heater 60 at the predetermined timing ($t_{1e}$) in the determination time period Per1 (i.e., the predetermined period of time) decreases. Specifically, in a case where the power consumption of the heating member is constant, the control portion sets the threshold temperature at a first temperature when the detected temperature of the heating member is a first value. In addition, the control portion sets the threshold temperature at a second temperature lower than the first temperature when the detected temperature of the heating member is a second value smaller than the first value.

In this manner, the control portion can appropriately determine the film thickness D by using the change in heat transfer property of the fixing film 14, which is caused by the change in the film thickness D; and can effectively reduce the occurrence of the hot offset.

In addition, as can be seen from Equation 2, if the temperature ($Th_{1e}$) of the heater 60 at the predetermined timing ($t_{1e}$) in the determination time period Per 1 (i.e., the predetermined period of time) is constant, the film thickness D is determined smaller and the threshold temperature $T_{th}$ is set lower as the power consumption Pw of the heater 60 decreases. Specifically, in a case where the detected temperature of the heating member is constant, the control portion sets the threshold temperature at a first temperature when the power consumption of the heating member is a first power consumption. In addition, the control portion sets the threshold temperature at a second temperature lower than the first temperature when the power consumption of the heating member is a second power consumption smaller than the first power consumption.

In this manner, the control portion can appropriately determine the film thickness D and effectively reduce the occurrence of the hot offset even if the amount of heat generated by the heater 60 differs in the fixing-unit warm-up sequence, for example, due to the difference in power-supply voltage.

In the present embodiment, if the temperature rise value is constant in the time period Per2, the film thickness D is determined smaller and the threshold temperature $T_{th}$ is set lower as the temperature rise value obtained in a period of time from the end of the time period Per2 to the end of the determination time period Per1 decreases. In addition, if the temperature rise value obtained in the period of time from the end of the time period Per2 to the end of the determination time period Per1 is constant, the film thickness D is determined smaller and the threshold temperature $T_{th}$ is set lower as the temperature rise value obtained in the time period Per2 decreases. The above description can be made in other words. That is, the threshold temperature in a case where a temperature rise value from the first temperature to the second temperature is a first value and where a temperature rise value from the second temperature to the third temperature is a second value is a first threshold temperature. In addition, the threshold temperature in a case where a temperature rise value from the first temperature to the second temperature is a third value smaller than the first value and where a temperature rise value from the second temperature to the third temperature is the second value is a second threshold temperature. In addition, the threshold temperature in a case where a temperature rise value from the first temperature to the second temperature is the first value and where a temperature rise value from the second temperature to the third temperature is a fourth value smaller than the second value is a third threshold temperature. In this case, the control portion changes the threshold temperature such that the second threshold temperature is lower than the first threshold temperature and the third threshold temperature is lower than the first threshold temperature. With this operation, the control portion can set an appropriate fixing temperature in accordance with the degree of wear of the fixing film 14, in consideration of the difference in power consumption of the heater 60.

By the way, in the present embodiment, the control portion appropriately determines the film thickness Din accordance with the difference in power-supply voltage, as in the first embodiment. That is, the control portion is configured to change the threshold temperature in accordance with the power consumption of the heating member and a temperature of the heating member detected by the first temperature detection portion. The temperature of the heating member is detected at a predetermined timing in a predetermined period of time if the heating member is energized at a predetermined energization rate over the predetermined period of time before the recording material reaches the fixing unit.

In this manner, the control portion can appropriately determine the film thickness D and effectively reduce the occurrence of the hot offset even if the amount of heat generated by the heater 60 differs in the fixing-unit warm-up sequence due to the difference in power-supply voltage.

Note that although the control for reducing the temperature rise in the non-sheet passing area is performed, in the present embodiment, based on the surface temperature of the pressing roller 15, the control for reducing the temperature rise in the non-sheet passing area may be performed, based on the surface temperature of the fixing film 14 or another member.

In addition, the control for reducing the temperature rise in the non-sheet passing area, performed in S403, is not limited to the method that decreases the throughput by increasing the conveyance interval while keeping the conveyance speed of the recording material. For example, the control for reducing the temperature rise in the non-sheet passing area may be performed by decreasing the conveyance speed from a normal conveyance speed of 230 mm/sec to another conveyance speed (e.g., 115 mm/sec). In this manner, since the temperature rise of the pressing roller 15 is reduced in the non-sheet passing area, it is possible to reduce the occurrence of the problem caused by the temperature rise in the non-sheet passing area.

The change in the threshold temperature Tin, used in the control for reducing the temperature rise in the non-sheet passing area, in accordance with the determination result of the film thickness of the surface layer of the fixing film 14, which is described in the present embodiment, may be embodied together with the change in the fixing temperature in accordance with the determination result of the film thickness of the surface layer of the fixing film 14, which is described in the first and the second embodiments.

Fourth Embodiment

Next, a fourth embodiment will be described. In the fourth embodiment, a feeding allowance temperature is corrected in accordance with the determination result of the power consumption of the fixing unit. The feeding allowance temperature is a threshold temperature at which the feeding of the first recording material is allowed in a job. The configuration of the image forming apparatus and the basic configuration and operation of the fixing unit are the same as those of the first embodiment. Hereinafter, a component given a reference symbol identical to a reference symbol of a component of the first embodiment has substantially the same structure and effect as those of the component described in the first embodiment, unless otherwise specified, and features different from the features of the first embodiment will be mainly described.

(1) Flow of Correction of Feeding Allowance Temperature

Figure 13:
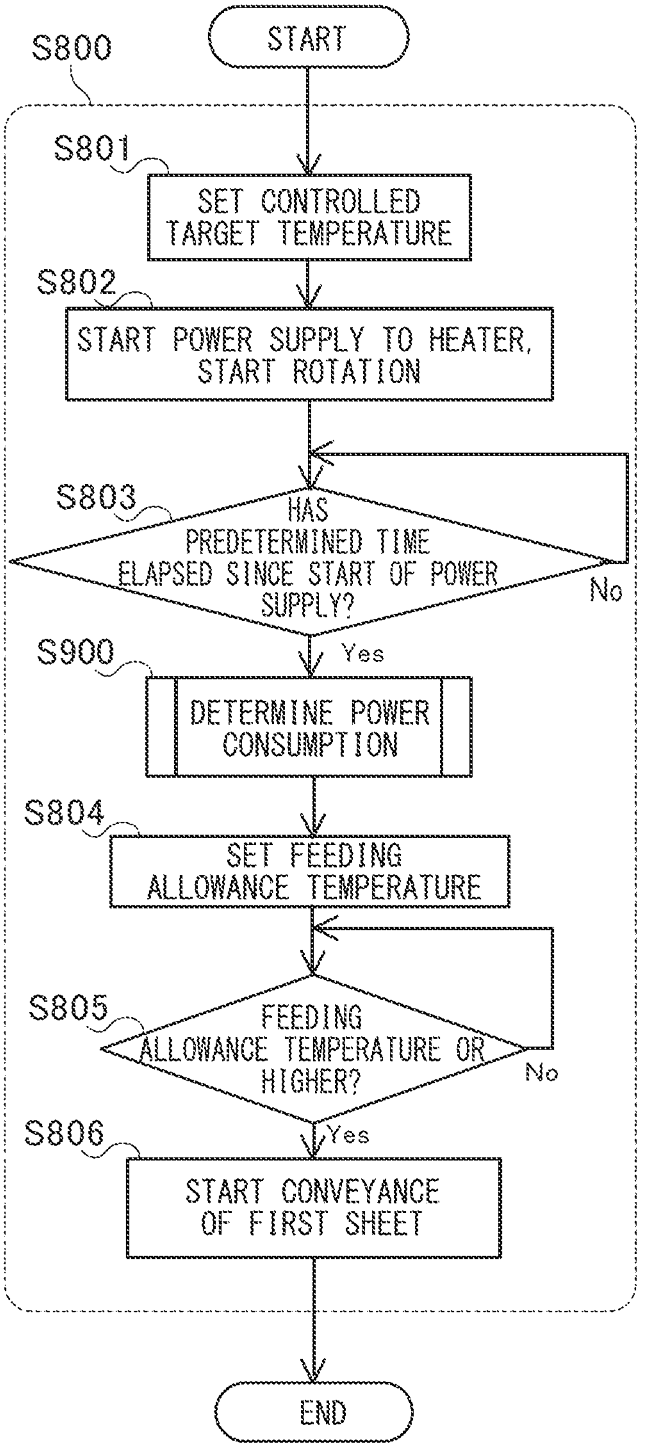
FIG. 13 is a flowchart illustrating control of a fourth embodiment.

Next, the feeding allowance temperature used in the fourth embodiment will be described with reference to a flowchart of FIG. 13. If a print signal is sent to the image forming apparatus 1, the control portion 40 starts a fixing-unit warm-up sequence S800.

In the fixing-unit warm-up sequence S800, the control portion 40 sets a controlled target temperature used in the fixing-unit warm-up sequence (S801). The method of setting the controlled target temperature (i.e., the warm-up temperature) is the same as that of the first embodiment (performed in S101). After the controlled target temperature is set (S801), the rotation of the pressing roller 15 is started, and at the same time, the power supply to the heater 60 is started (S802) and the fixing unit 13 starts to warm.

When a predetermined period of time has elapsed since the start of the power supply to the heater 60 (S803), the control portion 40 determines the power consumption of the fixing unit (S900). In the present embodiment, the predetermined period of time of S803 is set at 1.5 seconds.

After that, the control portion 40 reads a reference value of the feeding allowance temperature, which is set and stored in advance in the ROM 41*a*. Based on the reference value, the control portion 40 sets the feeding allowance temperature in accordance with the result of the power-consumption determination (S900) of the fixing unit (S804). The detailed description for the setting of the feeding allowance temperature, performed in accordance with the power consumption of the fixing unit, will be made below.

If the temperature detected by the thermistor 62 becomes equal to or larger than the feeding allowance temperature (S805), then the control portion 40 starts the conveyance of the first recording material P from the feeding tray 21 (S806), and ends the fixing-unit warm-up sequence S800.

(2) Determination of Power Consumption of Fixing Unit

Figure 14:
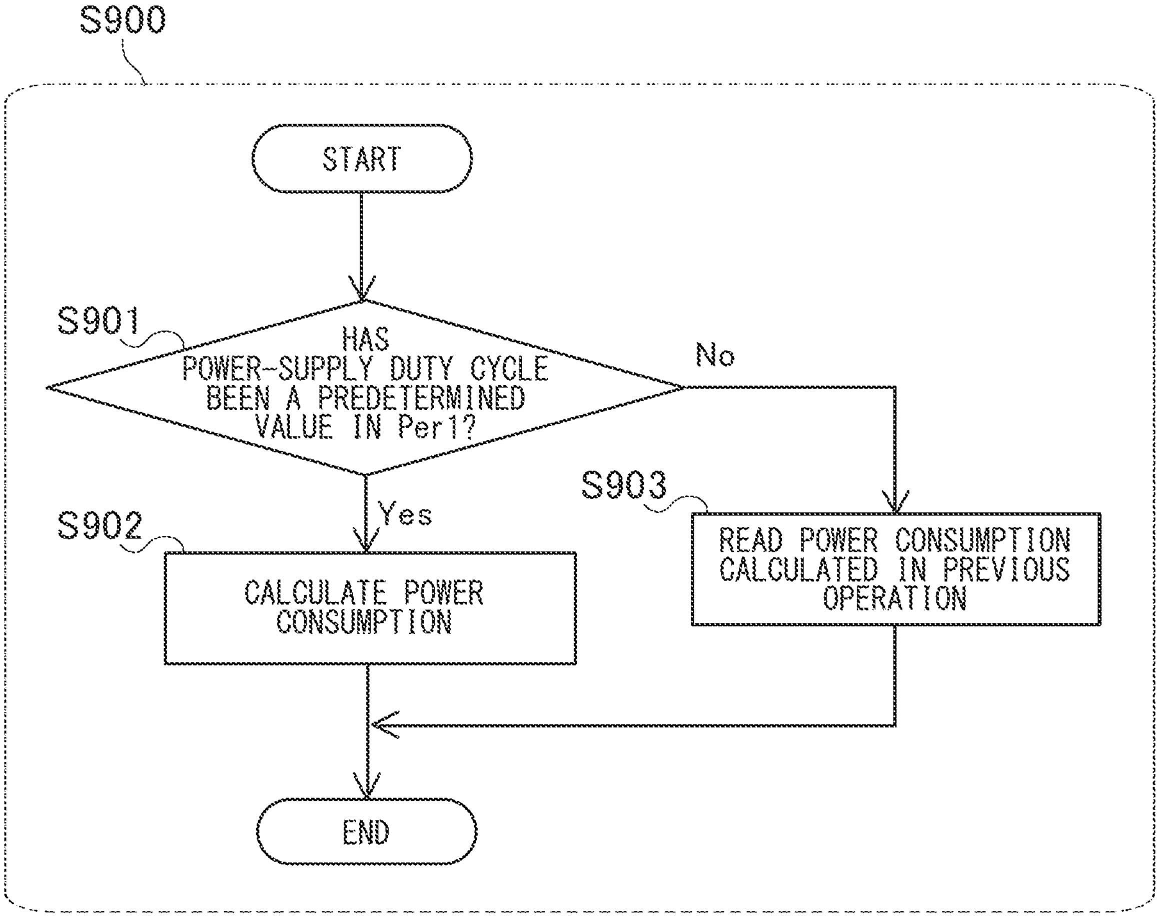
FIG. 14 is a flowchart illustrating control of the fourth embodiment.

Next, the determination (S900) of the power consumption of the fixing unit will be described with reference to a flowchart of FIG. 14. The power consumption of the fixing unit is the power consumed by the heater 60 of the fixing unit 13 (i.e., the power consumption of the heating member) when the electric power is suppled from the alternating-current power supply 30 to the fixing unit 13.

The calculation for the power-consumption determination (S900) of the fixing unit is performed, based on the information on the warm-up temperature curve, in a period of time (hereinafter referred to as a determination time period Per1) from when the power supply to the heater 60 is started, until when a predetermined period of time has elapsed since the start of the power supply to the heater 60. In the present embodiment, the determination time period Per1 is a period of time from when the power supply to the heater 60 is started, until when 1.4 seconds has elapsed since the start of the power supply to the heater 60.

In the power-consumption determination (S900) of the fixing unit, the control portion 40 determines whether the power-supply duty cycle in the determination time period Per1 has been a predetermined value since the start of the power supply to the heater 60 (S901). In the present embodiment, the control portion 40 determines whether the power-supply duty cycle in the determination time period Per1 has been 100%. If the power-supply duty cycle in the period of time from the start of the power supply to the end of the determination time period Per1 has been 100%, then the control portion 40 calculates the power consumption (S902).

However, if the voltage of the alternating-current power supply 30 has an extremely high value, or the preheating temperature of the fixing unit 13 has a high value, the temperature of the heater 60 may reach the controlled target temperature, and the power-supply duty cycle may become lower than 100% before the determination time period Per1 ends. In this case, the control portion 40 does not perform the calculation of the power consumption (S902) under the branch condition of S901, and reads the determination result on the power consumption obtained in the previous job (S903).

Figure 15A:
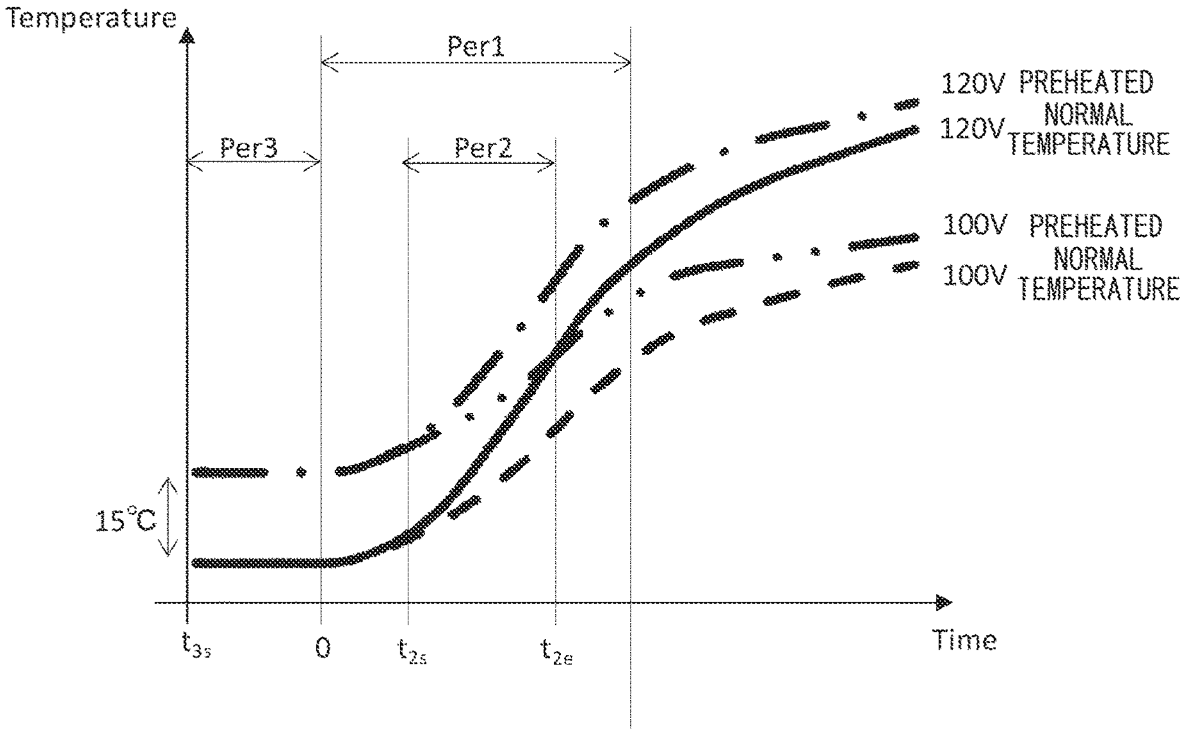
FIG. 15A is a graph illustrating an example of a warm-up temperature curve of the fourth embodiment.
Figure 15B:
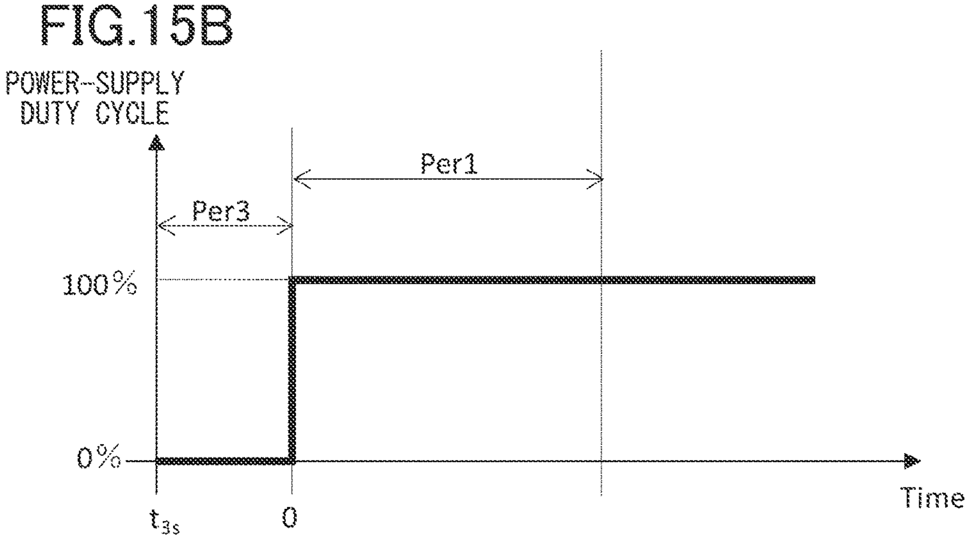
FIG. 15B is a graph illustrating an example of a power-supply duty cycle of the fourth embodiment.

Next, a method of calculating the power consumption (S902) will be described in detail with reference to FIGS. 15A and 15B. FIG. 15A illustrates the temperature that is detected by the thermistor 62 in the fixing-unit warm-up sequence S800, and the temperature changes with time (hereinafter, the change in the temperature with time is referred to as a warm-up temperature curve). In FIG. 15A, the start of the power supply to the heater 60 is set at 0 seconds. FIG. 15B is the power-supply duty cycle that corresponds to the warm-up temperature curve illustrated in FIG. 15A.

A solid line of FIG. 15A represents a warm-up temperature curve obtained in a case where the image forming apparatus 1 that includes the fixing unit 13 that had a normal temperature (or a room temperature such as 23° C.) was connected to an alternating-current power supply 30 of 120 V. A broken line represents a warm-up temperature curve obtained in a case where the image forming apparatus 1 that includes the above-described fixing unit 13 was connected to an alternating-current power supply 30 of 100 V.

For comparison, FIG. 15A also illustrates a warm-up temperature curve obtained in a case where the fixing unit 13 was started in a state where the fixing unit 13 had a temperature higher than the normal temperature by 15° C. (that is, in a state where the fixing unit 13 had been preheated). A dot-dash line of FIG. 15A represents a warm-up temperature curve obtained in a case where the image forming apparatus 1 that includes the fixing unit 13 that had a temperature higher than a normal temperature by 15° C. was connected to an alternating-current power supply 30 of 120 V. In addition, a dot-dot-dash line represents a warm-up temperature curve obtained in a case where the image forming apparatus 1 that includes the above-described fixing unit 13 was connected to an alternating-current power supply 30 of 100 V.

As illustrated in FIG. 15A, if the state of the fixing unit 13 is constant (that is, if the fixing unit 13 is preheated or not preheated), the temperature represented by the warm-up temperature curve increases as the voltage of the alternating-current power supply 30 increases. This is because the power consumed in the heat-generating resistance layer of the heater 60 increases as the voltage increases, increasing the amount of heat generated by the heater 60.

In addition, if another printing operation is performed immediately before the fixing-unit warm-up sequence, the preheated state of the fixing unit is changed, and the warm-up temperature curve is also changed by the change in the preheated state of the fixing unit 13. As illustrated in FIG. 15A, in a state where the fixing unit 13 is preheated, the slope of the warm-up temperature curve becomes smaller. This is because the amount of dissipated heat increases because the difference between the temperature of the preheated fixing unit 13 and the ambient temperature is larger than the difference between the temperature of the non-preheated fixing unit 13 and the ambient temperature. The preheated state of the fixing unit can be detected, based on the temperature of the heater 60 obtained before the power supply to the heater 60 is started.

In the calculation (S902) of the power consumption performed in the present embodiment, the electric power Pw (W) consumed in the heat-generating resistance layer of the heater 60 is estimated by using three temperatures $Th_{2e}$, $Th_{2s}$, and $Th_{3s}$ used in the warm-up temperature curve, and by using the following Equation 5.

$$Pw=k_7\times Th_{2e}+k_8\times Th_{2s}+k_9\times Th_{3s}+k_{10} \quad \text{Equation 5:}$$

In Equation 5, a parameter $Th_{2e}$ is a temperature detected by the thermistor 62 at the end timing ($t_{2e}$) of the time period Per2. In addition, a parameter $Th_{2s}$ is a temperature detected by the thermistor 62 at the start timing ($t_{2s}$) of the time period Per2. In addition, a parameter $Th_{3s}$ is a temperature detected by the thermistor 62 at the start timing ($t_{3s}$) of a time period Per3. In the present embodiment, the time period Per2 starts at a timing at which 0.8 seconds has elapsed since the start of the power supply to the heater 60, and ends at a timing at which 1.3 seconds has elapsed since the start of the power supply to the heater 60. The time period Per3 starts at a timing which is 0.5 seconds prior to the start of the power supply to the heater 60, and ends at a timing at which the power supply to the heater 60 starts. A parameter $k_7$ is a coefficient of 16.20 W/° C., a parameter $k_8$ is a coefficient of −6.628 W/° C., a parameter $k_9$ is a coefficient of −0.6134 W/° C., and a parameter $k_{10}$ is a constant of −1.980 W.

The temperature $Th_{2s}$ is an example of a first temperature. The first temperature is a temperature of the heating member at a first timing ($t_{2s}$) in a period of time in which the heating member is heated in the warm-up processing (i.e., the fixing-unit warm-up sequence) for the fixing unit 13. The temperature $Th_{2e}$ is an example of a second temperature. The second temperature is a temperature of the heating member at a second timing ($t_{2e}$) in the period of time. The first timing ($t_{2s}$) is earlier than the second timing ($t_{2e}$). The temperature $Th_{3s}$ is an example of a third temperature. The third temperature is a temperature of the heating member at a timing ($t_{3s}$) that is different from the first timing and the second timing.

In the fourth embodiment and the below-described fifth and sixth embodiments, the control portion uses the temperature of the heating member, as the third temperature, obtained at a fourth timing ($t_{3s}$) in a period of time (i.e., a time period Per3) before the heating of the heating member is started in the warm-up processing of the fixing unit 13. With this operation, the power consumption of the fixing unit 13 can be performed in consideration of the preheated state of the fixing unit 13. In the present embodiment, the control portion is configured to determine the power consumption of the heating member, based on the first temperature, the second temperature, and the third temperature, and change the fixing condition used in the job, based on the determination result of the power consumption. With this operation, the control portion can set an appropriate fixing condition in accordance with the power consumption.

For increasing the accuracy of determining the power consumption Pw, it is preferable to determine the power consumed in a period of time in which the warm-up temperature curve changes significantly such that the difference in the power consumption Pw has a larger value. Thus, it is preferable that the time period Per2 be set such that the time period Per2 includes a time period in which the slope of the warm-up temperature curve has the maximum value. In addition, since the time period Per3 has only to be set for determining the preheated state of the fixing unit 13, the time period Per3 may be a period of time, the temperature detected in which by the thermistor 62 is nearly equal to the temperature detected by the thermistor 62 in a period of time prior to the start of the power supply to the heater 60. For example, the period of time may start at a timing at which 0.1 seconds has elapsed since the start of the power supply, and end at a timing at which 0.3 seconds has elapsed since the start of the power supply to the heater 60. In another case, for reducing variations of the detected temperature, the temperature $Th_{3s}$ may be an average value calculated in a period of time that starts at a timing which is 0.1 seconds prior to the start of the power supply to the heater 60, and that ends at a timing at which 0.1 seconds has elapsed since the start of the power supply to the heater 60.

(3) Correction of Feeding Allowance Temperature

Figure 16A:
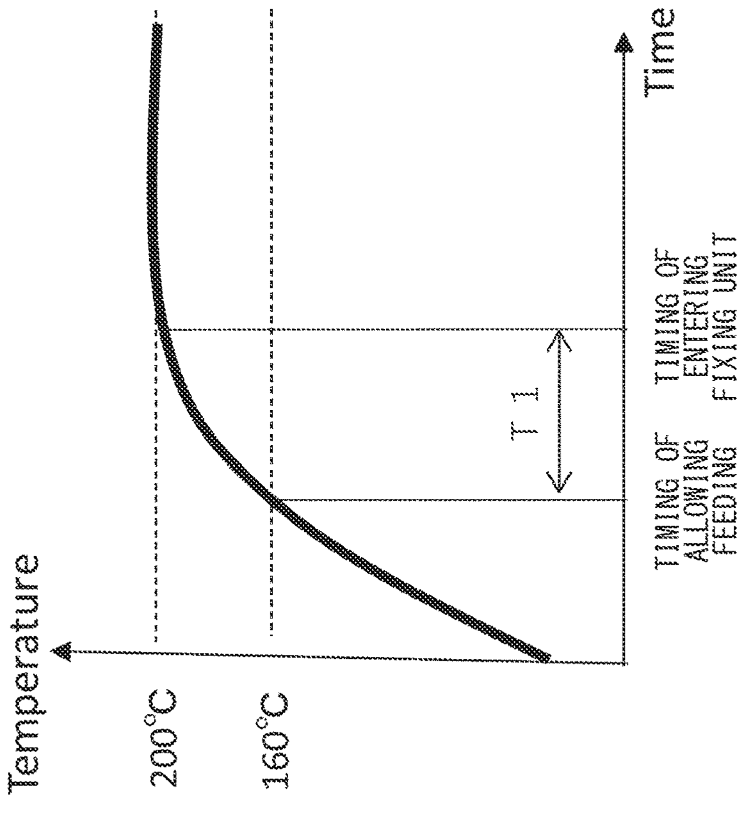
FIG. 16A is a graph illustrating an example of a warm-up temperature curve of the fourth embodiment and a feeding allowance temperature.
Figure 16B:
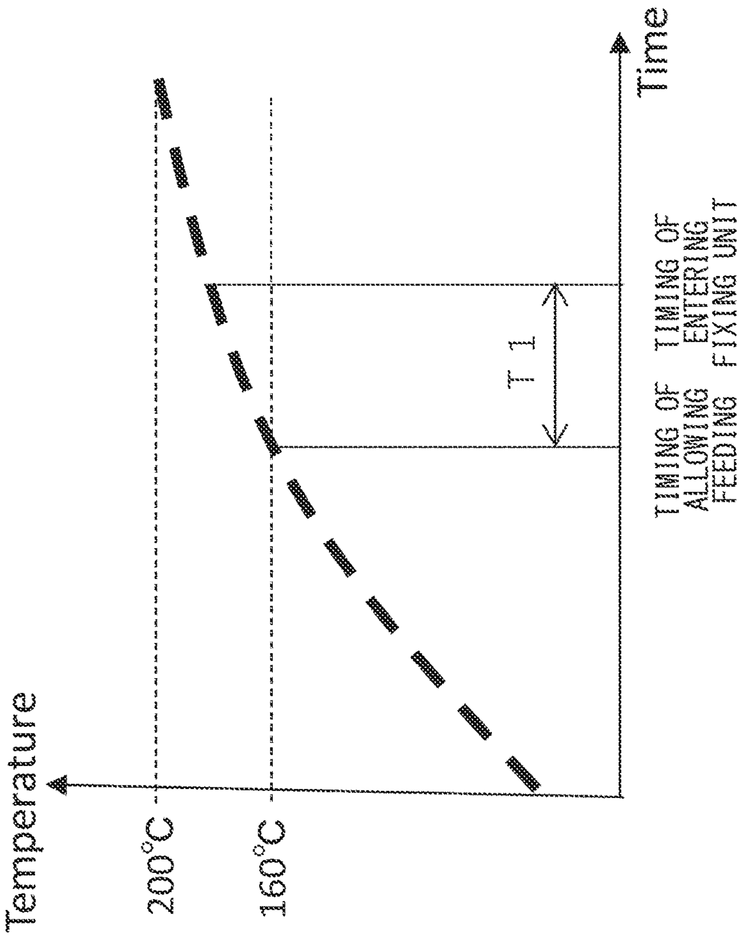
FIG. 16B is a graph illustrating an example of a warm-up temperature curve of the fourth embodiment and a feeding allowance temperature.

Next, a method of correcting the feeding allowance temperature in accordance with the result of the power-consumption determination (S900) of the fixing unit will be described with reference to FIGS. 16A and 16B. A solid line of FIG. 16A is a warm-up temperature curve in a case where the power consumption Pw of the heater 60 was 1100 W. In addition, a broken line of FIG. 16B is a warm-up temperature curve in a case where the power consumption Pw of the heater 60 was 900 W, and the power consumption Pw of the heater 60 was set by using the above-described fixing unit 13 and by replacing the alternating-current power supply 30 with another alternating-current power supply. As the power consumption Pw decreases, the amount of heat generated by the heater 60 decreases and the warm-up temperature curve lowers. In addition, a period of time Ti from when the recording material P is fed from the feeding tray 21, until when the recording material P enters the fixing unit 13, depends on the conveyance speed, and does not depend on the alternating-current power supply 30 and the resistance of the heater 60.

In the present embodiment, if the recording material P enters the fixing unit 13 when the temperature of the heater 60 is 200° C., good fixing property can be obtained. In a case where the power consumption Pw is 1100 W that is a reference value, the feeding allowance temperature is set at 160° C. that is a reference value. In this case, if the conveyance of the first recording material P from the feeding tray 21 is started when the temperature detected by the thermistor 62 reaches the feeding allowance temperature, the temperature of the heater 60 reaches the target temperature 200° C. when the first recording material P enters the fixing unit 13. In contrast, in a case where the power consumption is 900 W, if the feeding allowance temperature is set at 160° C., the temperature of the heater 60 is lower than 200° C. when the first recording material P enters the fixing unit 13. As a result, the failure of the fixing may occur.

Thus, in the present embodiment, the feeding allowance temperature $T_{fd}$ is set by using the following Equation 6 (S804) so that the feeding allowance temperature $T_{fd}$ increases as the power consumption Pw, determined in the power-consumption determination (S900) of the fixing unit, decreases.

$$T_{fd}=T_{fd\_0}+k_{th}\times(Pw-1100) \quad \text{Equation 6:}$$

In Equation 6, a parameter $k_{th}$ is a coefficient, and in the present embodiment, the parameter $k_{th}$ is −0.05° C./W. In addition, a parameter $T_{fd\_0}$ is a reference value of the feeding allowance temperature, and in the present embodiment, the parameter $T_{fd\_0}$ is 160° C.

FIG. 17 illustrates a result of an experiment in which the feeding allowance temperature was forced to have a predetermined value in the fixing-unit warm-up sequence, for checking whether the image defect of the first recording material occurs. The experiment was conducted in an environment with a normal temperature (room temperature) of 23° C. The result is indicated by a circle used in a case where no image defect occurred, and a black triangle used in a case where the heat was insufficient and the failure of fixing occurred.

In the present embodiment, the reference value of the feeding allowance temperature is set at 160° C. Thus, the feeding allowance temperature obtained by correcting the reference value in accordance with the power consumption Pw by using Equation 6 is 160° C. if the power consumption Pw of the heater 60 is 1100 W, and is 170° C. if the power consumption Pw of the heater 60 of 900 W. As can be seen from FIG. 17, since the feeding allowance temperature was set in accordance with the power consumption Pw, the failure of the fixing to the first recording material P did not occur in both cases where the power consumption Pw was 1100 W and 900 W.

Note that if the feeding allowance temperature is set at 170° C. regardless of the value of the power consumption Pw, the failure of the fixing does not occur but the start of the feeding of the first recording material P is delayed, in a case where the power consumption Pw is 1100 W, compared with the start of the feeding of the first recording material P performed in the present embodiment. Thus, in the present embodiment, a waiting time taken until the first image is outputted in a print job (i.e., an FPOT: first print-out time) can be shortened while good fixing property can be obtained.

Summary of the Present Embodiment

As described above, the control portion determines the power consumption Pw of the heater 60, based on the warm-up temperature curve; and corrects the feeding allowance temperature, based on the determination result. As a result, good fixing property can be obtained for the first recording material P, regardless of variations of the power consumption Pw. In addition, in the present embodiment, the good fixing property for the first recording material P and the shortening of the FPOT can be both achieved.

In the present embodiment, as the power consumption Pw of the heater 60 decreases, the timing at which the feeding of the first recording material P is started is set at a more delayed timing. That is, the control portion is configured to control the feeding of the recording material such that a timing at which the feeding of the first recording material is started in the job in a case where the power consumption of the heating member is a second power consumption smaller than a first power consumption is delayed compared with a timing at which the feeding of the first recording material is started in the job in a case where the power consumption is the first power consumption. With this operation, the control portion can appropriately set the feeding timing, which is one example of the fixing condition, in accordance with the power consumption Pw in the simple configuration; and can improve the performance of the image forming apparatus 1.

As can be seen from Equations 5 and 6, in the present embodiment, if the temperature $Th_{3s}$ obtained before the start of the fixing-unit warm-up sequence is constant, the power consumption Pw is determined smaller and the feeding allowance temperature is set higher as the temperature rise value decreases in the time period Per2. In addition, if the temperature rise value is constant in the time period Per2, the power consumption Pw is determined smaller and the feeding allowance temperature is set higher as the temperature $Th_{3s}$ obtained before the start of the fixing-unit warm-up sequence increases. The above description can be made in other words. That is, the feeding allowance temperature in a case where a temperature rise value from the first temperature to the second temperature is a first value and where the third temperature is a first temperature value is a first feeding allowance temperature. In addition, the feeding allowance temperature in a case where a temperature rise value from the first temperature to the second temperature is a second value smaller than the first value and where the third temperature is the first temperature value is a second feeding allowance temperature. In addition, the feeding allowance temperature in a case where a temperature rise value from the first temperature to the second temperature is the first value and where the third temperature is a second temperature value higher than the first temperature value is a third feeding allowance temperature. In this case, the control portion changes the feeding allowance temperature such that the second feeding allowance temperature is higher than the first feeding allowance temperature and the third feeding allowance temperature is higher than the first feeding allowance temperature. With this operation, the control portion can appropriately set the feeding allowance temperature, based on the first temperature, the second temperature, and the third temperature; and can improve the performance of the image forming apparatus 1.

Modification of Fourth Embodiment

In the present embodiment, the set value of the feeding allowance temperature is changed in accordance with the power consumption Pw. In a modification, the set value of the feeding start timing may be changed so that the timing at which the feeding of the first recording material P is started in a print job is delayed more as the power consumption Pw decreases. That is, the control portion may be configured to allow the start of the first recording material in the job, based on a fact that a certain standby time has elapsed since the start of heating of the heating member after the warm-up processing was started. In this case, if the standby time is set longer as the power consumption Pw decreases, the same effects as those of the present embodiment can be obtained.

In another modification, a delay time that is made longer as the power consumption Pw decreases may be set in a period of time from when the temperature detected by the thermistor 62 reaches the predetermined feeding allowance temperature, until when the feeding of the first recording material P is started.

Other Modification of Fourth Embodiment

In the fourth embodiment, the method of estimating the power consumption Pw by using the temperature of the heater 60 used in the fixing-unit warm-up sequence and obtained before the heating of the heater 60 is started, and by using the information on the warm-up temperature curve has been described as an example. In a modification, the power consumption Pw can be estimated in consideration of variations of size and characteristic value of each member of the fixing unit 13, by using the information in a case where the fixing unit 13 is manufactured. In the present modification, when the fixing unit 13 is manufactured, the warm-up temperature curve in a case where the electric power is supplied to the fixing unit 13 such that the fixing unit 13 consumes a predetermined amount of electric power is stored, and the estimate equation of Equation 5 is adjusted. As a result, the power consumption Pw can be estimated with higher accuracy, regardless of variations of size and characteristic value of each member. In the present embodiment, when the fixing unit 13 is manufactured, the warm-up temperature curve is measured in advance in a state where the power consumption is set at the reference value, and the information of the warm-up temperature curve is stored.

Specifically, when the fixing unit 13 is manufactured, the warm-up temperature curve is measured under the condition in which the power consumption Pw of the heater 60 is set at a reference value of 1100 W, and reference temperatures $Th_{2s\_s}$, $Th_{2e\_s}$, and $Th_{3s\_s}$ that correspond to the above-described temperatures $Th_{2e}$, $Th_{2s}$, and $Th_{3s}$ are obtained. Then, the information of the reference temperatures $Th_{2s\_s}$, $Th_{2e\_s}$, and $Th_{3s\_s}$ is stored in advance in a storage portion, such as the ROM 41*a*.

After the fixing unit 13 is manufactured, the control portion 40 estimates the power consumption Pw by using Equation 7 and the ratio of the temperatures $Th_{2e}$, $Th_{2s}$, and $Th_{3s}$, in a case where the fixing-unit warm-up sequence S800 is executed, to the reference temperatures $Th_{2s\_s}$, $Th_{2e\_s}$, and $Th_{3s\_s}$.

$$Pw=k_{11}\times Th_{2e}/Th_{2e\_s}+k_{12}\times Th_{2s}/Th_{2s\_s}+k_{13}\times Th_{3s}/Th_{3s\_s}+k_{14} \quad \text{Equation 7:}$$

In Equation 7, a parameter $Th_{2e\_s}$ is a temperature obtained in a case where the power consumption is set at a reference value, and detected by the thermistor 62 at the end timing of the time period Per2. In addition, a parameter $Th_{2s\_s}$ is a temperature obtained in the case where the power consumption is set at the reference value, and detected by the thermistor 62 at the start timing of the time period Per2. In addition, a parameter $Th_{3s\_s}$ is a temperature obtained in the case where the power consumption is set at the reference value, and detected by the thermistor 62 at the start timing of the time period Per3. In the present embodiment, the time period Per2 starts at a timing at which 0.8 seconds has elapsed since the start of the power supply to the heater 60, and ends at a timing at which 1.3 seconds has elapsed since the start of the power supply to the heater 60. In addition, the time period Per3 starts at a timing that is 0.5 seconds prior to the start of the power supply to the heater 60, and ends at a timing at which the power supply to the heater 60 starts. Parameters $k_{11}$, $k_{12}$, and $k_{13}$ are coefficients, and a parameter $k_{14}$ is a constant. For example, the parameter $k_{11}$ is 2430 W/° C., the parameter $k_{12}$ is −994.0 W/° C., the parameter $k_{13}$ is −92.00 W/° C., and the parameter $k_{14}$ is −297.0 W.

In another modification, the control portion 40 may estimate the power consumption Pw by using the difference between the reference temperatures $Th_{2s\_s}$, $Th_{2e\_s}$, and $Th_{3s\_s}$, in a case where the fixing unit 13 is manufactured, and the temperatures $Th_{2e}$, $Th_{2s}$, and $Th_{3s}$, detected in the fixing-unit warm-up sequence S800 after the fixing unit 13 is manufactured. In this case, the power consumption Pw can be estimated by using the following Equation 8.

$$Pw=k_{15}\times(Th_{2e}-Th_{2e\_s})+k_{16}\times(Th_{2s}-Th_{2s\_s})+k_{17}\times(Th_{3s}-Th_{3s\_s})+k_{18} \quad \text{Equation 8:}$$

In Equation 8, parameters $k_{15}$ to $k_{17}$ are coefficients, and a parameter $k_{18}$ is a coefficient. Also in this modification, the power consumption Pw can be estimated with higher accuracy, regardless of variations of size and characteristic value of each member.

Fifth Embodiment

Next, a fifth embodiment will be described. In the fifth embodiment, the throughput in continuous printing is changed in accordance with the determination result of the power consumption of the fixing unit. The configuration of the image forming apparatus and the basic configuration and operation of the fixing unit are the same as those of the first embodiment. Hereinafter, a component given a reference symbol identical to a reference symbol of a component of the first embodiment has substantially the same structure and effect as those of the component described in the first embodiment, unless otherwise specified, and features different from the features of the first embodiment will be mainly described.

(1) Conveyance Interval in Continuous Printing

Figure 18:
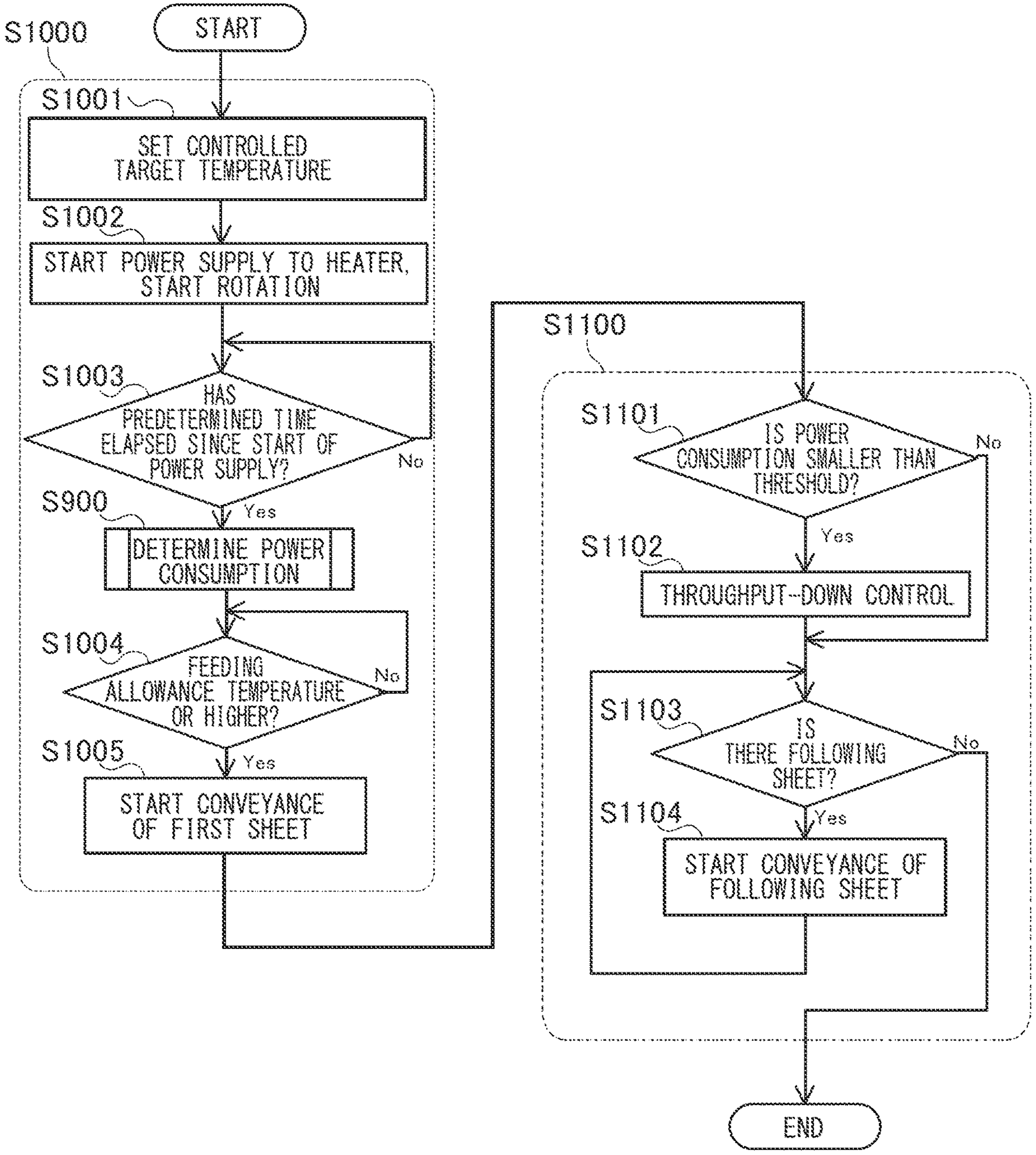
FIG. 18 is a flowchart illustrating control of a fifth embodiment.

The change of the throughput in the fifth embodiment will be described with reference to a flowchart of FIG. 18. If a print signal is sent to the image forming apparatus 1, the control portion 40 starts a fixing-unit warm-up sequence S1000.

In the fixing-unit warm-up sequence S1000, the control portion 40 sets a controlled target temperature used in the fixing-unit warm-up sequence (S1001). The method of setting the controlled target temperature (i.e., the warm-up temperature) is the same as that of the first embodiment (performed in S101). After the controlled target temperature is set (S1001), the rotation of the pressing roller 15 is started, and at the same time, the power supply to the heater 60 is started (S1002) and the fixing unit 13 starts to warm.

When a predetermined period of time has elapsed since the start of the power supply to the heater 60 (S1003), the control portion 40 determines the power consumption of the fixing unit (S900). The method of the power-consumption determination is the same as that (FIG. 14) descried in the fourth embodiment. In the present embodiment, the predetermined period of time in S1003 is set at 1.5 seconds.

After that, if the temperature detected by the thermistor 62 reaches a feeding allowance temperature that is set in advance and stored in the ROM 41*a* (S1004), the conveyance of the first recording material P from the feeding tray 21 is started (S1005) and the fixing-unit warm-up sequence S1000 ends.

After the fixing-unit warm-up sequence S1000, a throughput change sequence S1100 is started. In the throughput change sequence S1100, the throughput (productivity in printing) is changed in accordance with the determination result of the power consumption of the fixing unit, so that the temperature of the fixing unit 13 is kept at a temperature suitable for the fixing operation. The throughput is the number of the recording materials P to which the fixing unit 13 fixes an image per unit time (e.g., one minute).

In the throughput change sequence S1100, the control portion 40 reads an electric-power threshold stored in the ROM 41*a*, and the compares a power consumption Pw obtained in the power-consumption determination (S900), with the electric-power threshold (S1101). In the present embodiment, the electric-power threshold is set at 900 W. If the power consumption Pw is lower than the electric-power threshold, the control portion 40 proceeds to S1102 and performs throughput-down control. The throughput-down control makes the throughput in the continuous printing, lower than the throughput in the normal printing.

In the present embodiment, the throughput for A4-size plain paper sheets is normally set at 43 sheets/minute. In the throughput-down control performed in S1102, the throughput is decreased to 30 sheets/minute by increasing the interval at which the sheets pass through the fixing unit. The interval is an interval at which the recording materials pass through the fixing unit. In the present embodiment, the throughput-down control is performed by adjusting the interval between timings at which the conveyance of the recording material P from the feeding tray 21 is started, without changing the conveyance speed of the recording material P By increasing the interval at which the recording materials P pass through the fixing unit, a period of time in which the recording material P does not pass through the fixing nip F (FIG. 2) increases. If the period of time in which the recording material P does not pass through the fixing nip F increases, the amount of heat stored in the fixing film 14 increases. Thus, it becomes easy to secure the amount of heat suitable for fixing an image to the recording material P, by the time when a next recording material P reaches the fixing nip F.

If the second and the following recording materials P are to be conveyed (S1103), then the control portion 40 conveys the recording materials P from the feeding tray 21 at predetermined intervals at which the sheets pass through the fixing unit (S1104). If the fixing process has been performed on all the recording materials P, then the control portion 40 ends the throughput change sequence S1100.

FIG. 19 illustrates a result of an experiment in which the throughput value was forced to have a predetermined value, for checking whether the failure of the fixing occurs. The experiment was conducted in an environment with a temperature of 23° C. (room temperature, normal temperature). The table of FIG. 19 illustrates whether the failure of the fixing occurred when the throughput value and the power consumption Pw were changed. The result is indicated by a circle used in a case where no image defect occurred, and a black triangle used in a case where the heat was insufficient and the failure of fixing occurred.

As illustrated in FIG. 19, when the continuous printing operation was performed at a throughput of 43 sheets/minute in a case where the power consumption Pw was 900 W, the failure of the fixing occurred because the heat supplied to an image (i.e., toner on the recording material P) was insufficient. In the present embodiment, however, if the determination result of the power consumption Pw is 900 W, the throughput-down control (S1102) is performed because the power consumption Pw is lower than the threshold electric power (i.e., 1100 W), and the throughput value is changed into 30 sheets/minute. With this operation, the failure of the fixing hardly occurs because the interval at which the sheets pass through the fixing unit is increased.

If the throughput value is set at 30 sheets/minute regardless of the power consumption Pw, the failure of the fixing does not occur. In this case, however, although the throughput value can be set at 43 sheets/minute if the power consumption Pw is 1100 W, the throughput value will be set lower. In the present embodiment, since the throughput value is set at 43 sheets/minute if the power consumption Pw is 1100 W, the productivity in printing can be improved while the occurrence of the failure of the fixing is avoided.

Summary of the Present Embodiment

As described above, the control portion determines the power consumption Pw of the heater 60, based on the warm-up temperature curve; and corrects the throughput, based on the determination result. As a result, good fixing property can be obtained in the continuous printing, regardless of variations of the power consumption Pw. In addition, in the present embodiment, the good fixing property in the continuous printing and the improved productivity in printing can be both achieved.

In the present embodiment, as the power consumption Pw of the heater 60 decreases, the throughput value is set smaller. That is, the control portion changes the throughput such that the throughput value in a case where the power consumption of the heating member is a second power consumption lower than a first power consumption is smaller than the throughput value in a case where the power consumption is the first power consumption. With this operation, the control portion can appropriately set the throughput, which is one example of the fixing condition, in accordance with the power consumption Pw in the simple configuration; and can improve the performance of the image forming apparatus 1.

As can be seen from Equations 5 and 6, in the present embodiment, if the temperature $Th_{3s}$ obtained before the start of the fixing-unit warm-up sequence is constant, the power consumption Pw is determined smaller and the throughput value is set lower as the temperature rise value decreases in the time period Per2. In addition, if the temperature rise value is constant in the time period Per2, the power consumption Pw is determined smaller and the throughput value is set lower as the temperature $Th_{3s}$ obtained before the start of the fixing-unit warm-up sequence increases. The above description can be made in other words. That is, the throughput value in a case where a temperature rise value from the first temperature to the second temperature is a first value and where the third temperature is a first temperature value is a first throughput value. In addition, the throughput value in a case where a temperature rise value from the first temperature to the second temperature is a second value smaller than the first value and where the third temperature is the first temperature value is a second throughput value. In addition, the throughput value in a case where a temperature rise value from the first temperature to the second temperature is the first value and where the third temperature is a second temperature value higher than the first temperature value is a third throughput value. In this case, the control portion changes the throughput such that the second throughput value is smaller than the first throughput value and the third throughput value is smaller than the first throughput value. With this operation, the control portion can appropriately set the throughput, based on the first temperature, the second temperature, and the third temperature; and can improve the performance of the image forming apparatus 1.

Note that in the present embodiment, a method of increasing the interval at which the sheets pass through the fixing unit (i.e., the interval at which the sheets are fed) has been described, as an example, as the throughput-down control (S1102). Instead of this, in the throughput-down control (S1102), the conveyance speed (i.e., the process speed) of the recording material may be set at a conveyance speed (e.g., 115 mm/sec) lower than a normal conveyance speed (e.g., 230 mm/sec) in the printing operation. Also in this case, since a period of time in which the recording material P passes through the fixing nip F is increased, the amount of heat supplied to a toner image formed on the recording material P increases, so that the failure of the fixing hardly occurs. That is, even in this modification, the same advantages as those of the fifth embodiment can be produced.

Sixth Embodiment

Next, a sixth embodiment will be described. In the sixth embodiment, the amount of electric power (i.e., energization rate) supplied to the heater 60 is corrected in accordance with the result of the power-consumption determination (S900) of the fixing unit. The configuration of the image forming apparatus and the basic configuration and operation of the fixing unit are the same as those of the first embodiment. Hereinafter, a component given a reference symbol identical to a reference symbol of a component of the first embodiment has substantially the same structure and effect as those of the component described in the first embodiment, unless otherwise specified, and features different from the features of the first embodiment will be mainly described.

(1) Flow of Correction of Power Supply to Heater

Figure 20:
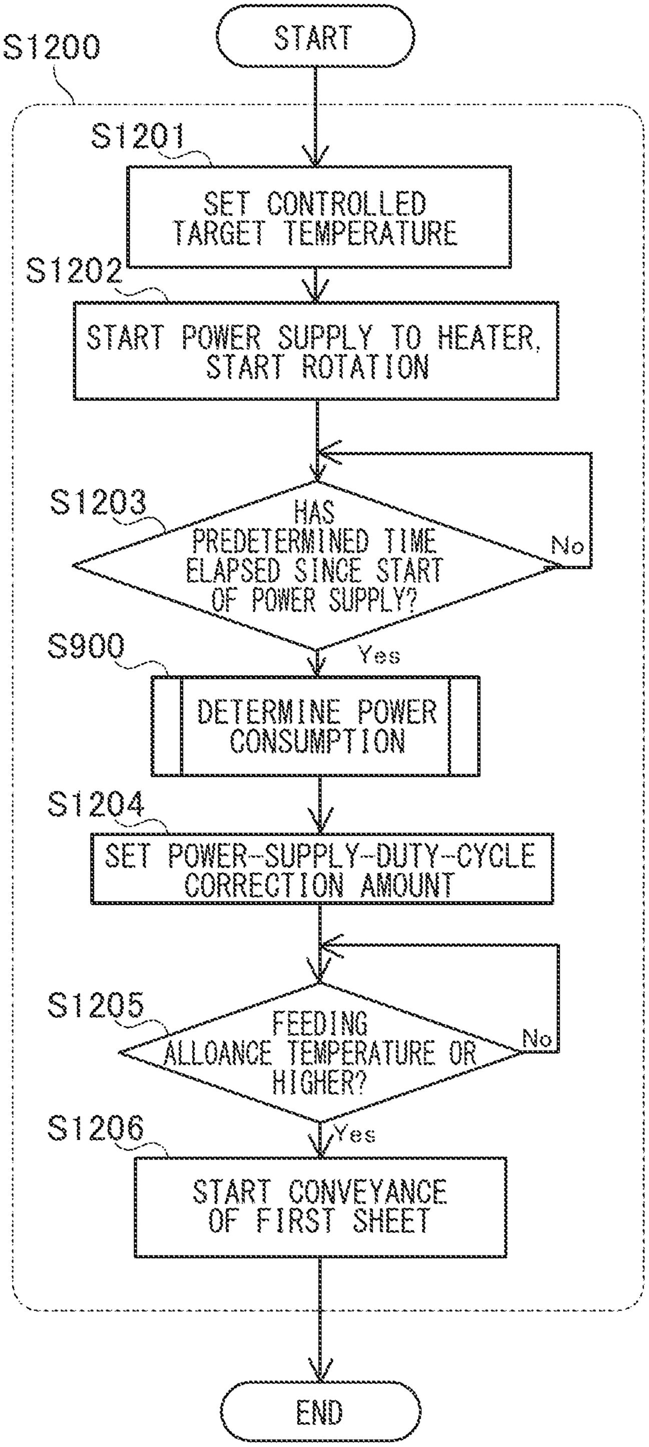
FIG. 20 is a flowchart illustrating control of a sixth embodiment.

The correction of the amount of electric power supplied to the heater 60 of the present embodiment will be described with reference to a flowchart of FIG. 20. If a print signal is sent to the image forming apparatus 1, the control portion 40 starts a fixing-unit warm-up sequence S1200.

In the fixing-unit warm-up sequence S1200, the control portion 40 sets a controlled target temperature used in the fixing-unit warm-up sequence (S1201). The method of setting the controlled target temperature (i.e., the warm-up temperature) is the same as that of the first embodiment (performed in S101).

After the controlled target temperature is set (S1201), the rotation of the pressing roller 15 is started, and at the same time, the power supply to the heater 60 is started (S1202) and the fixing unit 13 starts to warm. When a predetermined period of time has elapsed since the start of the power supply to the heater 60 (S1203), the control portion 40 determines the power consumption of the fixing unit (S900). The method of the power-consumption determination is the same as that (FIG. 14) descried in the fourth embodiment. In the present embodiment, the predetermined period of time in S1203 is set at 1.5 seconds.

After that, the control portion 40 reads a reference value of the power-supply-duty-cycle correction amount, which is set in advance and stored in the ROM 41*a*. In the present embodiment, the reference value of the amount of correction of power supply (i.e., the power-supply-duty-cycle correction amount) is 1.00.

The control portion 40 corrects the reference value in accordance with the power consumption Pw (S1204), which is determined in the power-consumption determination (S900). The control portion 40 controls the power-supply duty cycle (i.e., energization rate) of the heater 60 in the sheet passage sequence, by using the amount of correction of power supply (i.e., power-supply duty cycle) corrected in this manner. The control of the power-supply duty cycle performed in the sheet passage sequence will be described below.

After that, if the temperature detected by the thermistor 62 reaches a feeding allowance temperature (S1205), the conveyance of the first recording material P from the feeding tray 21 is started (S1206) and the fixing-unit warm-up sequence S1200 ends.

(2) Power-Consumption Determination of Fixing Unit and Correction of Power-Supply Duty Cycle The correction of electric power supplied to the heater 60 will be described with reference to FIG. 21. As described in the first embodiment, in the fixing unit 13, the electric power is supplied from the control portion 40, which is connected to the alternating-current power supply 30, to a power-supplying electrode of the heater 60, so that the heat-generating resistance layer of the heater 60 generates heat (FIG. 1, FIG. 2). The control portion 40 causes a triac (not illustrated), which is disposed in the control portion 40, to control the power-supply duty cycle of the heater 60, depending on the information on the temperature of the heater 60 outputted from the thermistor 62; and thereby performs the temperature control of the heater 60.

In the temperature control of the present embodiment, the power-supply duty cycle of the heater 60 is set by performing the PI control by using the difference (i.e., the temperature deviation) between the current temperature outputted by the thermistor 62 and a target temperature (i.e., a fixing temperature). In addition, the P value and the I value used in the PI control are set such that the temperature control becomes most stable when the power consumption Pw of the fixing unit 13 is 1100 W that is a reference value.

Figure 21A:
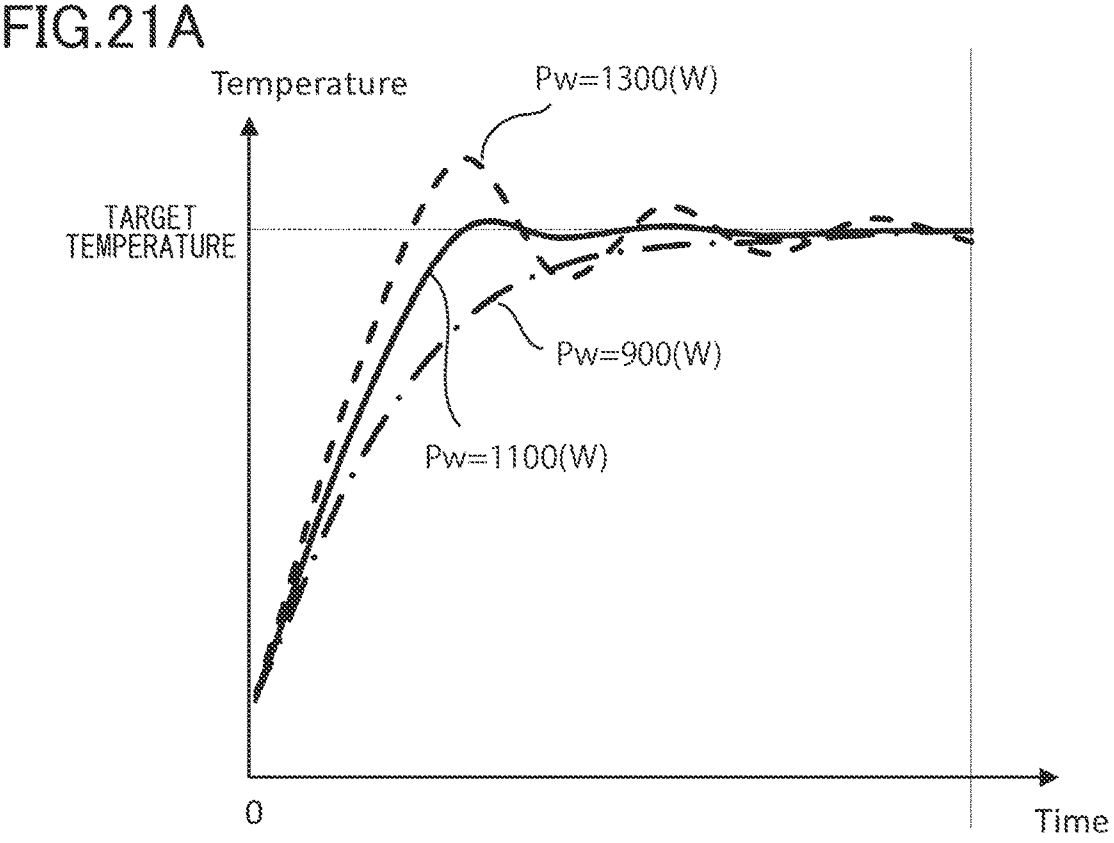
FIG. 21A is a graph illustrating an example of a warm-up temperature curve of the sixth embodiment.
Figure 21B:
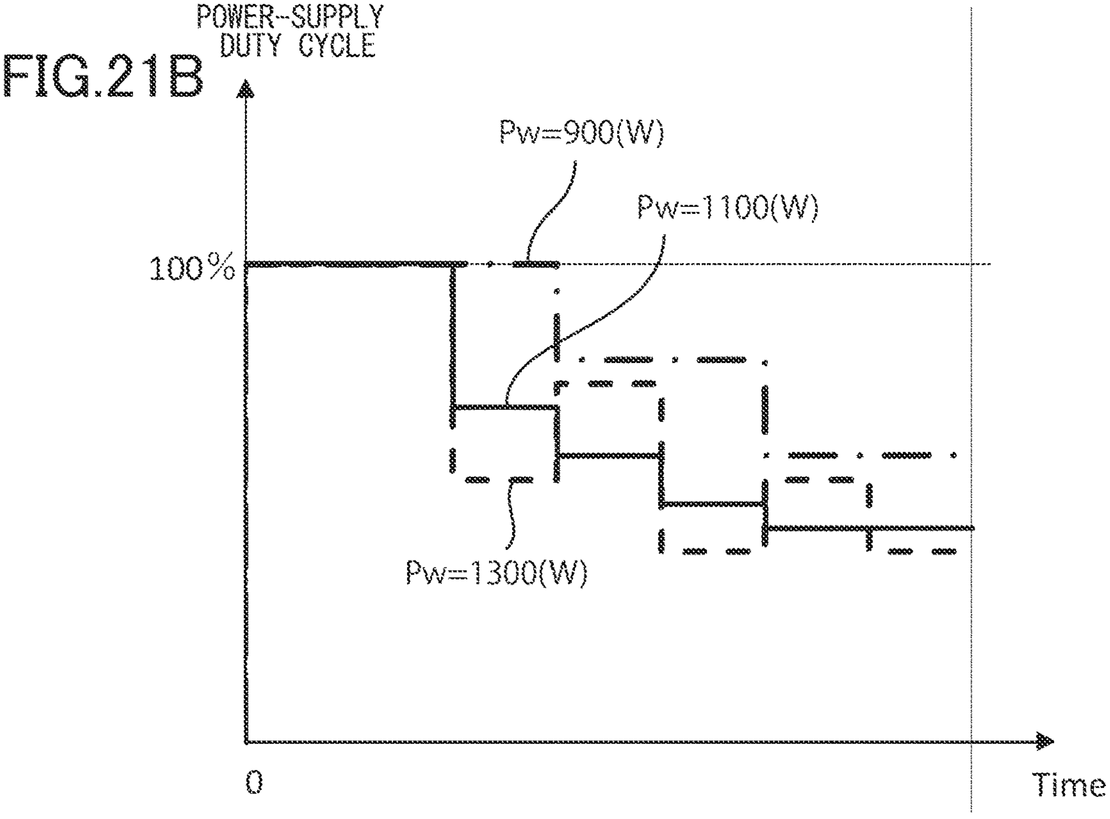
FIG. 21B is a graph illustrating an example of a power-supply duty cycle of the sixth embodiment.

A solid line of FIG. 21A is a temperature curve obtained in a case where the power consumption Pw of the fixing unit 13 is set at 1100 W. In addition, a broken line is a temperature curve obtained in a case where the power consumption Pw is set at 1300 W by using the above-described fixing unit 13 and changing the voltage of the alternating-current power supply 30. In addition, a dot-dash line is a temperature curve obtained in a case where the power consumption Pw is set at 900 W by using the above-described fixing unit 13 and changing the voltage of the alternating-current power supply 30. FIG. 21B is the power-supply duty cycle that corresponds to the warm-up temperature curve illustrated in FIG. 21A.

As can be seen from the comparison of the temperature curves of FIG. 21A, if the power consumption Pw is larger than the reference value of 1100 W, the temperature curve exceeds the target temperature. This is because if the power-supply duty cycle is constant and the power consumption Pw is higher than the reference value, the amount of heat generated by the heater 60 is larger than that obtained in a case where the power consumption Pw is the reference value.

In the present embodiment, a power-supply-duty-cycle correction amount B is determined, depending on the following Equation 9, so that the input electric-power ratio decreases as the power consumption Pw, determined in the power-consumption determination (S900), increases.

$$B=Pw0/Pw \quad \text{Equation 9:}$$

In Equation 9, a parameter Pw0 is a reference value of the power consumption Pw, and in the present embodiment, the parameter Pw0 is 1100 W. The value of the power-supply duty cycle (that is a base value of the power-supply duty cycle, based on the temperature deviation), calculated in the PI control, is denoted by X (%). In the present embodiment, the heat generated by the heater 60 is controlled by using a power-supply duty cycle $X_B$. The power-supply duty cycle $X_B$ is obtained by using the power-supply-duty-cycle correction amount B, determined by using Equation 9, and by correcting the power-supply duty cycle B by using the following Equation 10.

$$X_B=X\times B \quad \text{Equation 10:}$$

FIG. 22 illustrates a result of an experiment in which a continuous printing operation was performed in a state where the power consumption Pw and the power-supply-duty-cycle correction amount B were forced to have predetermined values, for checking whether the failure of the fixing performed on the first to the fifth recording materials P occurs. The experiment was conducted in an environment with a temperature of 23° C. (room temperature, normal temperature). The result is indicated by a circle used in a case where no image defect occurred, a white triangle used in a case where the hot offset occurred, and a black triangle used in a case where the heat was insufficient and the failure of fixing occurred.

If the present embodiment is applied to the experiment, the power-supply-duty-cycle correction amount B is 1.22 when the power consumption Pw is 900 W, 1.00 when the power consumption Pw is 1100 W, and 0.86 when the power consumption Pw is 1300 W. As can be seen from FIG. 22, when the present embodiment was applied to the experiment, the image defect did not occur even when the power consumption Pw was changed.

In a comparative example, the correction of the power-supply duty cycle in accordance with the power consumption Pw was not performed, for comparison. In the comparative example, the power-supply-duty-cycle correction amount B in the fixing-unit warm-up sequence was 1.00, regardless of the power consumption. In this case, as illustrated in FIG. 22, in a case where the power consumption Pw was 1300 W, since it takes time for the temperature of the heating element to become stable (as indicated by the broken line of FIG. 21A), the hot offset or the failure of the fixing occurred, in some cases, in images formed on the first to the fifth recording materials P. In addition, in a case where the power consumption Pw was 900 W, since the heat was insufficient, the image defect occurred in some cases. In other comparative examples, the hot offset or the failure of the fixing occurred also when the power-supply-duty-cycle correction amount B in the fixing-unit warm-up sequence was set at 0.86 or 1.22 regardless of the power consumption.

Summary of the Present Embodiment

As described above, in the present embodiment, the control portion determines the power consumption Pw of the fixing unit 13, based on the warm-up temperature curve; and corrects the power-supply duty cycle, based on the determination result. As a result, the temperature control can be performed stably and good fixing property can be obtained, regardless of variations of the power consumption Pw.

In the present embodiment, the power-supply-duty-cycle correction amount B is set such that if the difference between the fixing temperature Tc2 and the temperature detected by the thermistor 62 is constant, the power-supply duty cycle $X_B$ corrected as described above increases as the power consumption Pw determined in the power-consumption determination decreases. That is, the control portion changes the correction value such that if the temperature deviation is constant, the energization rate of the heating member obtained in a case where the power consumption is a second power consumption lower than a first power consumption is higher than the energization rate obtained in a case where the power consumption is the first power consumption. With this operation, the control portion can more appropriately set the correction value of the energization rate, which is one example of the fixing condition, in accordance with the power consumption Pw in the simple configuration; and can improve the performance of the image forming apparatus 1.

As can be seen from Equations 5 and 6, in the present embodiment, if the temperature $Th_{3s}$ obtained before the start of the fixing-unit warm-up sequence is constant, the power consumption Pw is determined smaller and the power-supply-duty-cycle correction amount B is set higher as the temperature rise value decreases in the time period Per2. In addition, if the temperature rise value is constant in the time period Per2, the power consumption Pw is determined smaller and the power-supply-duty-cycle correction amount B is set higher as the temperature $Th_{3s}$ obtained before the start of the fixing-unit warm-up sequence increases. The above description can be made in other words. That is, the energization rate in a case where the temperature deviation is a first temperature deviation, when a temperature rise value from the first temperature to the second temperature is a first value, and where the third temperature is a first temperature value is a first energization rate. In addition, the energization rate in a case where the temperature deviation is the first temperature deviation, when a temperature rise value from the first temperature to the second temperature is a second value smaller than the first value, and where the third temperature is the first temperature value is a second energization rate. In addition, the energization rate in a case where the temperature deviation is the first temperature deviation, when a temperature rise value from the first temperature to the second temperature is the first value, and where the third temperature is a second temperature value higher than the first temperature value is a third energization rate. In this case, the control portion changes the correction value such that the second energization rate is higher than the first energization rate and the third energization rate is higher than the first energization rate. With this operation, the control portion can appropriately set the energization rate, based on the first temperature, the second temperature, and the third temperature; and can improve the performance of the image forming apparatus 1.

Other Examples

In each of the above-described embodiments, the power-consumption determination (S302) is performed by using the information of the warm-up temperature curve. However, a circuit for detecting the electric power that flows through the heater 60 may be disposed, and the power consumption Pw may be directly detected by using the circuit. In another case, a circuit for detecting the current that flows through the heater 60 may be disposed. In this case, the resistance value of the heat-generating resistance layer of the heater 60 may be measured in advance, and the power consumption Pw may be calculated by using the relationship between the resistance value and the current.

In addition, the film-thickness determination (S303) may be performed without determining the power consumption Pw. In this case, the film-thickness determination (S303) can be performed by using the following Equation 11 obtained by substituting Equation 1 in Equation 2 and by developing Equation 2.

$$D=k_7\times(Th_{2e}-Th_{2s})+k_4\times(Th_{1e}-Th_{2e})+k_8 \quad \text{Equation 11:}$$

In Equation 11, $k_7=k_3\times k_1$, $k_8=k_5+k_3\times k_2$.

In the first embodiment, for determining in S301 whether the power-supply duty cycle has been a predetermined value (i.e., a predetermined energization rate), the control portion determines whether the power-supply duty cycle in the determination time period Per1 has been 100%. In this case, slight variations of the power-supply duty cycle can be allowed if the variations do not affect the warm-up temperature curve in the determination time period Per1. For example, in the first embodiment, it is acceptable that the average value of the power-supply duty cycle in the determination time period Per1, which is 2.4 seconds, is in a range from 99.8 to 100%, and that the moving-average value of the power-supply duty cycle, calculated in each time period of 0.3 seconds, in the determination time period Per1 is in a range from 98.5 to 100%. In this case, since the warm-up temperature curve hardly changes, the above-described variations of the power-supply duty cycle are acceptable. Similarly, also in the second embodiment, slight variations of the power-supply duty cycle, determined in S301, can be allowed if the variations do not affect the warm-up temperature curve.

Figure 9A:
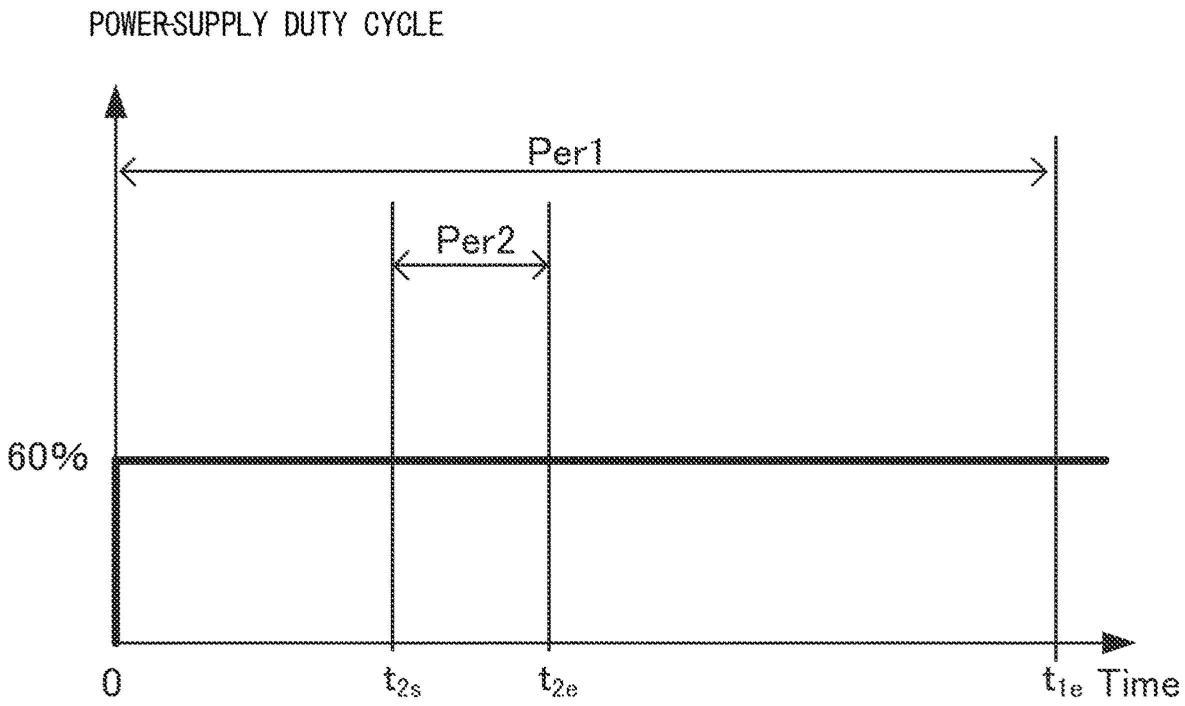
FIG. 9A is a graph illustrating an example of a power-supply duty cycle of a modification.
Figure 9B:
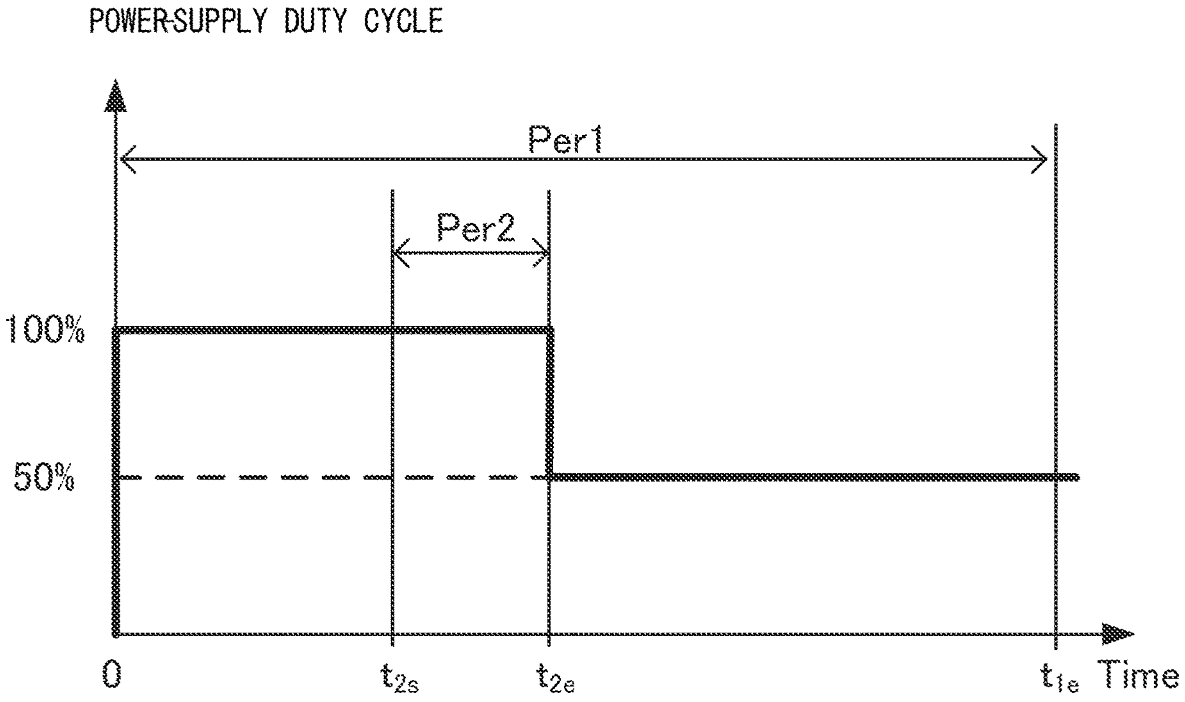
FIG. 9B is a graph illustrating an example of a power-supply duty cycle of a modification.

In another case, the power-supply duty cycle may be prevented from varying, and the determination in S301 may not be performed. For example, instead of adjusting the power-supply duty cycle so that the temperature of the heater 60 approaches the warm-up temperature Tc1, the power-supply duty cycle may have a fixed value of 60% in the determination time period Per1, as illustrated in FIG. 9A. In another case, as illustrated in FIG. 9B, in the determination time period Per1, the power-supply duty cycle may have a fixed value of 100% until the time period Per2 ends, and may have a fixed value of 50% after the end of the time period Per2.

In the above-described embodiments, the power consumption Pw is estimated by using only the information of the warm-up temperature curve (Equation 1), and the film thickness D is also estimated by using only the information of the warm-up temperature curve (Equation 2). However, other information (hereinafter referred to as information A) may affect the shape of the warm-up temperature curve. In this case, the estimate equation can be modified as appropriate in accordance with the information A. As the information A, the information on the temperature (i.e., the environmental temperature) of an installation site of the image forming apparatus 1, or the preheated state of the fixing unit 13 at the start of the fixing-unit warm-up sequence S100 may be used.

In addition, the surface hardness of the pressing roller 15, or variations (manufacturing tolerances that are variations produced in manufacturing) of the size or a characteristic value (e.g., an electrical-resistance characteristic of the heater 60) of each member of the fixing unit 13 may affect the shape of the warm-up temperature curve. In this case, the size or variations (produced in manufacturing) of a characteristic value of each member may be measured when the fixing unit 13 is manufactured, stored in a storage portion, such as the ROM 41*a*, and used as the information A. In another case, a total heat transfer property of the fixing unit 13 in which variations of one parameter produced in manufacturing are combined with variations of another parameter produced in manufacturing may be used as the information A.

For adjusting the estimate equation, a plurality of candidates for each of coefficients and constants, $k_1$ to $k_5$, may be prepared for Equation 1 and Equation 2, and the values of the coefficients and constants may be changed in accordance with the information A.

In another case, a term in which the information A is multiplied by a coefficient $k_9$ may be added to Equation 1 for forming Equation 1', and a term in which the information A is multiplied by a coefficient $k_{10}$ may be added to Equation 2 for forming Equation 2'. In this case, by using Equation 1' and Equation 2', the power consumption Pw (W) of the heater 60 and the film thickness D (μm) of the surface layer of the fixing film 14 may be estimated.

$$Pw=k_1\times(Th_{2e}-Th_{2s})+k_2+k_9\times A \quad \text{Equation 1':}$$

$$D=k_3\times Pw+k_4\times(Th_{1e}-Th_{2e})+k_5+k_{10}\times A \quad \text{Equation 2':}$$

Modifications

In the above-described embodiments, the description has been made for the configuration that includes the film-heating fixing unit that uses an endless film member as the fixing member. The fixing unit, however, is not limited to this. For example, the fixing member may be an endless member (a fixing belt) that is stretched by and wound around a plurality of rollers. In addition, the heating member may be a halogen lamp that emits radiant heat, or a magnetic-field generating unit, such as a coil, that causes a conductive layer formed in the fixing member, to generate heat through electromagnetic induction.

In the above-described embodiments, the description has been made for the configuration in which the target temperature (i.e., the fixing temperature Tc2), used for the fixing, or the threshold temperature $T_{th}$, used for the control for reducing the temperature rise in the non-sheet passing area, is changed in accordance with the determination result of the film thickness of the surface layer of the fixing member. The present disclosure, however, is not limited to this. For example, another setting condition of the printing operation or the operation of the image forming apparatus may be changed in accordance with the determination result of the film thickness of the surface layer of the fixing member. For example, the remaining life of the fixing unit may be predicted, based on the determination result of the film thickness of the surface layer of the fixing member, and a notification that urges a user to replace the fixing unit with a new one may be issued to a user when the remaining life becomes less than a threshold value.

The present disclosure described above can provide an image forming apparatus that can perform the control in accordance with the state of the fixing unit, in a simple configuration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2022-127345, filed on Aug. 9, 2022, and 2023-102208, filed on Jun. 22, 2023, which are hereby incorporated by reference herein in their entirety.

What is claimed is:

1. An image forming apparatus comprising:

an image forming portion configured to form an image on a recording material;

a fixing unit including a fixing member configured to rotate, a heating member configured to be energized to heat the fixing member, and a temperature detection portion configured to output a detection signal corresponding to a temperature of the heating member, the fixing unit being configured to fix the image to the recording material by using the fixing member; and a control portion configured to execute warm-up processing in which the heating member is heated to a predetermined target temperature, the warm-up processing being executed in a period of time before a first recording material is conveyed to the fixing unit in a case where a job for forming the image on the recording material is inputted to the image forming apparatus, wherein if a temperature of the heating member at a first timing in the period of time in which the heating member is being heated in the warm-up processing is a first temperature, a temperature of the heating member at a second timing that is in the period of time and that is later than the first timing is a second temperature, and a temperature of the heating member at a timing that is in the period of time and that is later than the second timing is a third temperature, the control portion is configured to change a fixing condition used in the job, based on the first temperature, the second temperature, and the third temperature that are detected by the temperature detection portion, and wherein the control portion is configured to:

determine power consumption of the heating member by using a temperature rise value from the first temperature to the second temperature;

determine a thickness of the fixing member by using a determination result of determining the power consumption and a temperature rise value from the second temperature to the third temperature; and change the fixing condition used in the job, in accordance with a determination result of determining the thickness of the fixing member.

2. The image forming apparatus according to claim 1, wherein the control portion is configured not to rotate the fixing member in a period of time from the first timing to the second timing in the warm-up processing, and is configured to rotate the fixing member after the second timing.

3. The image forming apparatus according to claim 1, wherein if a target temperature of the heating member for fixing the image to the recording material is a fixing temperature, the control portion is configured to change the fixing temperature such that a value of the fixing temperature in a case where the thickness of the fixing member is a second thickness smaller than a first thickness is lower than a value of the fixing temperature in a case where the thickness of the fixing member is the first thickness.

4. The image forming apparatus according to claim 3, wherein if a target temperature of the heating member for fixing an image to a recording material is a fixing temperature, if the fixing temperature in a case where a temperature rise value from the first temperature to the second temperature is a first value and where a temperature rise value from the second temperature to the third temperature is a second value is a first fixing temperature, if the fixing temperature in a case where a temperature rise value from the first temperature to the second temperature is a third value smaller than the first value and where a temperature rise value from the second temperature to the third temperature is the second value is a second fixing temperature, and if the fixing temperature in a case where a temperature rise value from the first temperature to the second temperature is the first value and where a temperature rise value from the second temperature to the third temperature is a fourth value smaller than the second value is a third fixing temperature, the control portion is configured to change the fixing temperature such that the second fixing temperature is lower than the first fixing temperature and the third fixing temperature is lower than the first fixing temperature.

5. The image forming apparatus according to claim 1, further comprising a second temperature-detection portion configured to output a detection signal in accordance with a temperature of an end area of the heating member in a rotation-axis direction of the fixing member, wherein if a temperature of the end area exceeds a threshold temperature, the control portion is configured to perform control for reducing excessive temperature rise in the end area, based on the detection signal from the second temperature-detection portion, and wherein the control portion is configured to change the threshold temperature such that the threshold temperature in a case where the thickness of the fixing member is a second thickness smaller than a first thickness is lower than the threshold temperature in a case where the thickness of the fixing member is the first thickness.

6. The image forming apparatus according to claim 5, wherein if the threshold temperature in a case where a temperature rise value from the first temperature to the second temperature is a first value and where a temperature rise value from the second temperature to the third temperature is a second value is a first threshold temperature, if the threshold temperature in a case where a temperature rise value from the first temperature to the second temperature is a third value smaller than the first value and where a temperature rise value from the second temperature to the third temperature is the second value is a second threshold temperature, and if the threshold temperature in a case where a temperature rise value from the first temperature to the second temperature is the first value and where a temperature rise value from the second temperature to the third temperature is a fourth value smaller than the second value is a third threshold temperature, the control portion is configured to change the threshold temperature such that the second threshold temperature is lower than the first threshold temperature and the third threshold temperature is lower than the first threshold temperature.

7. An image forming apparatus comprising:

an image forming portion configured to form an image on a recording material;

a fixing unit including a fixing member configured to rotate, a heating member configured to be energized to heat the fixing member, and a temperature detection portion configured to output a detection signal corresponding to a temperature of the heating member, the fixing unit being configured to fix the image to the recording material by using the fixing member; and a control portion configured to execute warm-up processing in which the heating member is heated to a predetermined target temperature, the warm-up processing being executed in a period of time before a first recording material is conveyed to the fixing unit in a case where a job for forming the image on the recording material is inputted to the image forming apparatus, wherein if a temperature of the heating member at a first timing in the period of time in which the heating member is being heated in the warm-up processing is a first temperature, a temperature of the heating member at a second timing that is in the period of time and that is later than the first timing is a second temperature, and a temperature of the heating member at a timing before heating of the heating member is started in the warm-up processing is a third temperature, the control portion is configured to change a fixing condition used in the job, based on the first temperature, the second temperature, and the third temperature that are detected by the temperature detection portion, and wherein the control portion is configured to:

determine power consumption of the heating member based on the first temperature, the second temperature, and the third temperature; and change the fixing condition used in the job based on the determination result of the power consumption.

8. The image forming apparatus according to claim 7, wherein the control portion is configured to control feeding of the recording material such that a timing at which feeding of the first recording material is started in the job in a case where power consumption of the heating member is a second power consumption smaller than a first power consumption is delayed compared with a timing at which the feeding of the first recording material is started in the job in a case where the power consumption is the first power consumption.

9. The image forming apparatus according to claim 8, wherein the control portion is configured to allow start of the first recording material in the job, based on the temperature of the heating member reaching a feeding allowance temperature after the start of the warm-up processing.

10. The image forming apparatus according to claim 9, wherein if the feeding allowance temperature in a case where a temperature rise value from the first temperature to the second temperature is a first value and where the third temperature is a first temperature value is a first feeding allowance temperature, if the feeding allowance temperature in a case where a temperature rise value from the first temperature to the second temperature is a second value smaller than the first value and where the third temperature is the first temperature value is a second feeding allowance temperature, and if the feeding allowance temperature in a case where a temperature rise value from the first temperature to the second temperature is the first value and where the third temperature is a second temperature value higher than the first temperature value is a third feeding allowance temperature, the control portion is configured to change the feeding allowance temperature such that the second feeding allowance temperature is higher than the first feeding allowance temperature and the third feeding allowance temperature is higher than the first feeding allowance temperature.

11. The image forming apparatus according to claim 8, wherein the control portion is configured to allow the start of the first recording material in the job, based on a predetermined standby time having elapsed since the start of heating of the heating member after start of the warm-up processing.

12. The image forming apparatus according to claim 7, wherein if the number of recording materials on which images are formed per unit time in a case where the image forming apparatus continuously forms images on a plurality of recording materials is a throughput, the control portion is configured to change the throughput such that a throughput value in a case where power consumption of the heating member is a second power consumption lower than a first power consumption is smaller than a throughput value in a case where the power consumption is the first power consumption.

13. The image forming apparatus according to claim 12, wherein if the throughput value in a case where a temperature rise value from the first temperature to the second temperature is a first value and where the third temperature is a first temperature value is a first throughput value, if the throughput value in a case where a temperature rise value from the first temperature to the second temperature is a second value smaller than the first value and where the third temperature is the first temperature value is a second throughput value, and if the throughput value in a case where a temperature rise value from the first temperature to the second temperature is the first value and where the third temperature is a second temperature value higher than the first temperature value is a third throughput value, the control portion is configured to change the throughput such that the second throughput value is smaller than the first throughput value and the third throughput value is smaller than the first throughput value.

14. The image forming apparatus according to claim 7, wherein if a target temperature of the heating member for fixing an image to a recording material is a fixing temperature, if a ratio of a time in which the heating member is energized per unit time to the unit time is an energization rate, and if a difference between the fixing temperature and a temperature of the heating member detected by the temperature detection portion is a temperature deviation, the control portion is configured to determine the energization rate by using a base value of the energization rate based on the temperature deviation and a correction value used for correcting the base value, and the control portion is configured to change the correction value such that if the temperature deviation is constant, a value of the energization rate of the heating member in a case where power consumption of the heating member is a second power consumption lower than a first power consumption is higher than a value of the energization rate in a case where the power consumption is the first power consumption.

15. The image forming apparatus according to claim 14, wherein if the energization rate in a case where the temperature deviation is a first temperature deviation, where a temperature rise value from the first temperature to the second temperature is a first value, and where the third temperature is a first temperature value is a first energization rate, if the energization rate in a case where the temperature deviation is the first temperature deviation, where a temperature rise value from the first temperature to the second temperature is a second value smaller than the first value, and where the third temperature is the first temperature value is a second energization rate, and if the energization rate in a case where the temperature deviation is the first temperature deviation, where a temperature rise value from the first temperature to the second temperature is the first value, and where the third temperature is a second temperature value higher than the first temperature value is a third energization rate, the control portion is configured to change the correction value such that the second energization rate is higher than the first energization rate and the third energization rate is higher than the first energization rate.

16. The image forming apparatus according to claim 1, wherein the first timing and the second timing are set in advance such that the time period includes a time period in which a temperature rise value of the heating member per unit time becomes maximum in a case where the warm-up processing is started in a state where the heating member has a room temperature.

17. The image forming apparatus according to claim 1, wherein if energization rate of the heating member is a predetermined value over a predetermined period of time in which the warm-up processing is performed in a current job, the control portion sets the fixing condition used in the current job, based on the first temperature, the second temperature, and the third temperature detected in the warm-up processing, and wherein if the energization rate of the heating member is not the predetermined value in at least one part of the predetermined period of time, the control portion sets the fixing condition used in the current job, by using a set value stored in a storage portion.

18. The image forming apparatus according to claim 1, wherein the fixing member is a tubular film, wherein the heating member includes a heat generating resistor configured to be energized to generate heat, and is disposed in an internal space of the film, wherein the fixing unit further includes a pressing roller sandwiching the film together with the heating member to form a nip portion between the film and the pressing roller, and wherein the fixing unit is configured to heat the image on the recording material in the nip portion by using the film heated by the heating member.

19. The image forming apparatus according to claim 7, wherein the first timing and the second timing are set in advance such that the time period includes a time period in which a temperature rise value of the heating member per unit time becomes maximum in a case where the warm-up processing is started in a state where the heating member has a room temperature.

20. The image forming apparatus according to claim 7, wherein if energization rate of the heating member is a predetermined value over a predetermined period of time in which the warm-up processing is performed in a current job, the control portion sets the fixing condition used in the current job, based on the first temperature, the second temperature, and the third temperature detected in the warm-up processing, and wherein if the energization rate of the heating member is not the predetermined value in at least one part of the predetermined period of time, the control portion sets the fixing condition used in the current job, by using a set value stored in a storage portion.

21. The image forming apparatus according to claim 7, wherein the fixing member is a tubular film, wherein the heating member includes a heat generating resistor configured to be energized to generate heat, and is disposed in an internal space of the film, wherein the fixing unit further includes a pressing roller sandwiching the film together with the heating member to form a nip portion between the film and the pressing roller, and wherein the fixing unit is configured to heat the image on the recording material in the nip portion by using the film heated by the heating member.

* * * * *